US010326325B2

(12) United States Patent
Lee et al.

(10) Patent No.: US 10,326,325 B2
(45) Date of Patent: Jun. 18, 2019

(54) ROTOR AND MOTOR INCLUDING THE SAME

(71) Applicant: LG ELECTRONICS INC., Seoul (KR)

(72) Inventors: Jangwon Lee, Seoul (KR); Seungsuk Oh, Seoul (KR); Heon Lee, Seoul (KR); Junho Ahn, Seoul (KR); Jaemin Kim, Seoul (KR); Dosun Kim, Seoul (KR); Hyounguk Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 347 days.

(21) Appl. No.: 15/258,878

(22) Filed: Sep. 7, 2016

(65) Prior Publication Data

US 2017/0070107 A1   Mar. 9, 2017

Related U.S. Application Data

(60) Provisional application No. 62/215,708, filed on Sep. 8, 2015.

(30) Foreign Application Priority Data

May 23, 2016   (KR) .......................... 10-2016-0063069
May 23, 2016   (KR) .......................... 10-2016-0063072

(51) Int. Cl.
   *H02K 21/12*   (2006.01)
   *H02K 1/27*    (2006.01)
   (Continued)

(52) U.S. Cl.
   CPC ............. *H02K 1/2786* (2013.01); *H02K 1/30* (2013.01); *H02K 1/32* (2013.01)

(58) Field of Classification Search
   CPC ...................................................... H02K 1/278
   (Continued)

(56) References Cited

U.S. PATENT DOCUMENTS 4,677,335 A *  6/1987  Ueda ........................ H02K 5/18
                                                        310/268
8,344,568 B2 *  1/2013  Bailey ................... D06F 37/304
                                                        310/156.12
(Continued)

FOREIGN PATENT DOCUMENTS

EP   2 065 510   6/2009
EP   2 722 971   4/2014
(Continued)

OTHER PUBLICATIONS

International Search Report and Written Opinion dated Dec. 14, 2016 issued in Application No. PCT/KR2016/010030.
(Continued)

*Primary Examiner* — Alexander Talpalatski
(74) *Attorney, Agent, or Firm* — Ked & Associates, LLP

(57) ABSTRACT

Disclosed are a rotor that is capable of more efficiently using magnetic flux from magnets and a motor including the same. The rotor includes a plurality of rotor cores, a plurality of magnets magnetized such that magnetic flux is formed in the circumferential direction, the magnets and the rotor cores being alternately arranged in the circumferential direction, a coupler connected to a shaft, and a rotor frame including a coupler base connected to the coupler, an extension base extending from the coupler base in the radial direction, and a rotary base extending from the extension base in the axial direction of the shaft for supporting the rotor cores and the magnets while surrounding the rotor cores and the magnets, wherein the coupler base, the extension base, and the rotary base are integrally formed by injection molding, and the rotor frame is coupled to the coupler, the rotor cores, and the
(Continued)

magnets, and wherein the extension base is provided with crossing ribs that cross in the radial direction.

17 Claims, 9 Drawing Sheets

(51) Int. Cl.
*H02K 1/30* (2006.01)
*H02K 1/32* (2006.01)

(58) Field of Classification Search
USPC .......................................................... 310/44
See application file for complete search history.

(56) References Cited

U.S. PATENT DOCUMENTS

| | | | |
|---|---|---|---|
| 8,482,176 B2* | 7/2013 | Bailey | D06F 37/304 310/156.12 |
| 8,946,954 B2* | 2/2015 | Peterson | H02K 1/187 310/67 R |
| 2009/0301142 A1 | 12/2009 | Marioni | |
| 2013/0278094 A1 | 10/2013 | Peterson et al. | |
| 2013/0328432 A1* | 12/2013 | Hoemann | H02K 1/2786 310/156.12 |
| 2014/0102151 A1* | 4/2014 | Yoon | H02K 1/2773 68/140 |
| 2014/0117799 A1 | 5/2014 | Lu et al. | |
| 2014/0225471 A1 | 8/2014 | Kawanami | |
| 2015/0380998 A1* | 12/2015 | Hoemann | H02K 1/2786 310/156.12 |

FOREIGN PATENT DOCUMENTS

| | | |
|---|---|---|
| EP | 2 728 720 | 5/2014 |
| JP | 2004-254493 | 9/2004 |
| JP | 2014-158332 | 8/2014 |
| KR | 10-2006-0121001 | 11/2006 |
| KR | 10-2014-0049201 | 4/2014 |

OTHER PUBLICATIONS

European Search Report dated Apr. 1, 2019 issued in Application No. 16844681.3.

* cited by examiner

ROTOR AND MOTOR INCLUDING THE SAME

This application claims the benefit of U.S. Patent Provisional Application No. 62/215,708, filed on Sep. 8, 2015, Korean Patent Application No. 10-2016-0063069, filed on May 23, 2016, and Korean Patent Application No. 10-2016-0063072, filed on May 23, 2016, which are hereby incorporated by reference as if fully set forth herein.

BACKGROUND OF THE INVENTION

Field of the Invention

The present invention relates to a rotor and a motor including the same, and more particularly to a rotor that is capable of more efficiently using magnetic flux from magnets and a motor including the same.

Discussion of the Related Art

A motor is a device that drives a rotor using electromagnetic force generated between the rotor and a stator. Generally, the rotor is rotated relative to the stator.

Motors may be used in various devices. For example, a motor may be used as a driving device for rotating the drum of a washing machine. That is, the rotor is connected to a shaft of the drum such that rotation of the rotor is converted into the rotation of the drum to perform washing.

The motor, particularly the rotor, used in the washing machine transmits relatively strong force to the drum via the shaft. For this reason, the rigidity of the rotor is critical, and the rotor is required to be highly efficient.

A conventional rotor used in the washing machine is generally configured such that a plurality of magnets is fixed to a rotor frame, which is made of an iron plate, in the state of being arranged in the circumferential direction of the rotor frame. That is, the iron plate serves as a rotor core, and performs a back yoke function. However, magnetic flux may leak from the rotor frame, since the rotor frame is made of an iron plate. The magnetic flux may leak outward in the radial direction, and has no relation to the rotation of the rotor. Consequently, it is difficult to provide a high-efficiency motor.

In addition, the thickness of the iron plate is relatively large in order to secure the rigidity of the rotor frame. As a result, the weight of the rotor is increased.

Therefore, there is a high necessity for a rotor having high efficiency and high output and a motor including the same.

Meanwhile, noise may be generated during the rotation of the rotor. In addition, unnecessary vibration may also be generated during rotation of the rotor. The vibration of the rotor may be generated as the result of torque riffle.

Therefore, there is a high necessity for a rotor having low noise and vibration and a motor including the same.

SUMMARY OF THE INVENTION

Accordingly, the present invention is directed to a rotor and a motor including the same that substantially obviate one or more in problems due to limitations and disadvantages of the related art.

One object of the present invention is to provide a rotor that can be easily manufactured and a motor including the same.

Another object of the present invention is to provide a rotor that can be manufactured through a single injection molding process and a motor including the same.

Another object of the present invention is to provide a rotor that is capable of minimizing the leakage of magnetic flux, thereby achieving high efficiency and high output and a motor including the same.

Another object of the present invention is to provide a rotor that exhibits sufficient rigidity and strength while the weight of the rotor is reduced.

Another object of the present invention is to provide a rotor that can be manufactured with reduced material costs and can be easily handled.

Another object of the present invention is to provide a rotor having a cooling structure that is capable of limiting the increase in temperature of a stator or cooling the stator.

Another object of the present invention is to provide a rotor configured such that rotor cores and magnets are coupled to a rotor frame at uniform intervals.

Another object of the present invention is to provide a rotor configured such that rotor cores and magnets are securely coupled to a rotor frame.

Another object of the present invention is to provide a rotor configured such that a plurality of magnets is disposed in a spoke arrangement so as to be magnetized inward and outward in the radial direction.

A further object of the present invention is to provide a rotor configured such that magnets are entirely magnetized.

Additional advantages, objects, and features will be set forth in part in the description which follows and in part will become apparent to those having ordinary skill in the art upon examination of the following or may be learned from practice. The objectives and other advantages may be realized and attained by the structure particularly pointed out in the written description and claims hereof as well as the appended drawings.

To achieve these objects and other advantages and in accordance with the purpose of the invention, as embodied and broadly described herein, in accordance with an aspect of the present invention, a rotor includes a plurality of rotor cores, a plurality of magnets magnetized such that magnetic flux is formed in the circumferential direction, the magnets and the rotor cores being alternately arranged in the circumferential direction, a coupler connected to a shaft, and a rotor frame including a coupler base connected to the coupler, an extension base extending from the coupler base in the radial direction, and a rotary base extending from the extension base in the axial direction of the shaft for supporting the rotor cores and the magnets while surrounding the rotor cores and the magnets, wherein the coupler base, the extension base, and the rotary base are integrally formed by injection molding, and the rotor frame is coupled to the coupler, the rotor cores, and the magnets, and wherein the extension base is provided with crossing ribs that cross in the radial direction.

The extension base may include a crossing zone formed between radial inner tips of the crossing ribs and radial outer tips of the crossing ribs.

A crossing point of the crossing ribs may be adjacent to the radial inner tips of the crossing ribs.

The extension base may be provided with a plurality of radial ribs extending in the radial direction and arranged in the circumferential direction at uniform intervals.

A specific one of the radial ribs may extend through the crossing point in the radial direction, and the crossing ribs may be provided between radial ribs formed at circumferentially opposed sides of the specific radial rib.

A vertical through part may be formed between each of the crossing ribs and a corresponding one of the radial ribs.

Six sections may be formed about the crossing point by the three adjacent radial ribs and the crossing ribs, and the through parts may be formed in four of the sections, excluding two of the sections having the smallest area and located inward in the radial direction.

The extension base may include a non-crossing zone located outside the crossing zone in the radial direction and connected to the rotary base.

The non-crossing zone may be connected to the rotary base via a step part.

The crossing zone and the non-crossing zone may be partitioned by circumferential ribs formed in the circumferential direction.

Radial ribs may be continuously connected from the coupler base to the rotary base, and the radial ribs may be arranged in the circumferential direction at uniform intervals.

A specific one of the radial ribs may extend through the crossing point of the crossing ribs in the radial direction, and the crossing ribs may be provided between radial ribs formed at circumferentially opposed sides of the specific radial rib.

The specific radial rib may extend through the circumferential center of a specific one of the rotor cores, and an adjacent radial rib may extend through the circumferential center of a rotor core that is two cores away from the specific rotor core in the circumferential direction.

The non-crossing zone may be provided with a radial rib formed at a middle part between the two adjacent radial ribs so as to extend through the circumferential center of a corresponding one of the rotor cores.

The rotor frame may include a reference bottom surface and a reference top surface that define an external shape thereof, and the radial ribs may protrude downward from the reference bottom surface.

The radial ribs and the circumferential ribs may protrude upward from the reference top surface.

The non-crossing zone may be connected to the rotary base via a step part, and the radial ribs may extend to a radial tip of the rotary base via the step part.

The coupler base and the extension base may be partitioned by support ribs formed in the circumferential direction.

No vertical through parts may be formed in the coupler base and the non-crossing zone.

The rotary base may be formed so as to surround top surfaces, bottom surfaces, and outer circumferential surfaces of the rotor cores and the magnets excluding inner circumferential surfaces of the rotor cores and the magnets that define gaps between the rotor cores and a stator and between the magnets and the stator.

In another aspect of the present invention, a rotor includes a plurality of rotor cores, a plurality of magnets magnetized such that magnetic flux is formed in the circumferential direction, the magnets and the rotor cores being alternately arranged in the circumferential direction, a coupler connected to a shaft, and a rotor frame including a coupler base connected to the coupler, an extension base extending from the coupler base in the radial direction, and a rotary base extending from the extension base in the axial direction of the shaft (substantially in the vertically upward direction) for supporting the rotor cores and the magnets while surrounding the rotor cores and the magnets, wherein the coupler base, the extension base, and the rotary base are integrally formed by injection molding, and the rotor frame is coupled to the coupler, the rotor cores, and the magnets, and wherein the extension base includes a heat dissipation zone connected to the coupler base and having a plurality of through parts for heat dissipation and a reinforcement zone connected to the rotary base for increasing the strength of connection with the rotary base.

No through parts may be formed in the reinforcement zone. Alternatively, the total area of through parts formed in the reinforcement zone may be smaller than the total area of through parts formed in the heat dissipation zone.

The heat dissipation zone and the reinforcement zone may be partitioned by circumferential ribs formed in the circumferential direction.

In another aspect of the present invention, a rotor includes a plurality of rotor cores, a plurality of magnets magnetized such that magnetic flux is formed in the circumferential direction, the magnets and the rotor cores being alternately arranged in the circumferential direction, a coupler connected to a shaft, and a rotor frame including a coupler base connected to the coupler, an extension base extending from the coupler base in the radial direction, and a rotary base extending from the extension base in the axial direction of the shaft for supporting the rotor cores and the magnets while surrounding the rotor cores and the magnets.

The coupler base, the extension base, and the rotary base may be integrally formed by injection molding, and the rotor frame may be coupled to the coupler, the rotor cores, and the magnets. Consequently, the rotor frame may be very easily manufactured.

The rotary base may be formed so as to surround the top surfaces, the bottom surfaces, and the outer circumferential surfaces of the rotor cores and the magnets excluding the inner circumferential surfaces of the rotor cores and the magnets that define gaps between the rotor cores and the stator and between the magnets and the stator. Consequently, it is possible to provide a rotor, particularly an outer type rotor, configured such that the rotor cores and the magnets are more securely coupled to the rotor frame.

The rotary base may be formed so as to surround the top surfaces, the bottom surfaces, and the inner circumferential surfaces of the rotor cores and the magnets, excluding the outer circumferential surfaces of the rotor cores and the magnets that define gaps between the rotor cores and the stator and between the magnets and the stator. Consequently, it is possible to provide a rotor, particularly an inner type rotor, configured such that the rotor cores and the magnets are more securely coupled to the rotor frame.

The inner circumferential surfaces or the outer circumferential surfaces of the rotor cores and the magnets that define the gap may be exposed outward. That is, the inner circumferential surfaces or the outer circumferential surfaces that define the gap may not be surrounded by the rotor frame. As a result, the gap may be uniform.

The inner circumferential surfaces or the outer circumferential surfaces of the rotor cores that define the gap may be exposed outward, and the rotary base may be formed so as to surround the inner circumferential surfaces or the outer circumferential surfaces of the magnets that define the gap. Consequently, one surface of each of the rotor cores that define the gap may not be surrounded by the rotor frame, and one surface of each of the magnets that define the gap may be surrounded by the rotor frame. As a result, the magnets may be supported inward or outward in the radial direction.

The circumferential width of each of the magnets may be larger than the radial width of each of the magnets, and the magnets may be magnetized such that magnets provided at opposite sides of a specific rotor core generate magnetic flux in opposite directions. Magnetic flux directed from opposite sides of one rotor core toward the circumferential center of the rotor core may be concentrated in the radial direction through the rotor core.

The rotary base may include a lower cover for covering the bottom surfaces of the rotor cores and the magnets, an upper cover for covering the top surfaces of the rotor cores and the magnets, and a side cover extending from the lower cover to the upper cover for covering the inner circumferential surfaces or the outer circumferential surfaces of the rotor cores and the magnets. Consequently, the exposure of the rotor cores and the magnets may be minimized, excluding the parts of the rotor cores and the magnets that define the gap. In addition, most parts of the rotor cores and the magnets may be surrounded by the rotor frame, whereby the rotor cores and the magnets may be securely supported in the rotor frame.

The rotor cores may be provided with fixing holes, into which fixing pins provided in an injection mold are inserted to fix the rotor cores in the mold. As a result, the rotor cores may remain in position during injection molding.

The lower cover or the upper cover may be provided with cover holes, through which the fixing holes are exposed outward as the result of the fixing pins being separated from the rotor frame after injection molding of the rotor frame.

The inner diameter of the cover holes may be larger than the inner diameter of the fixing holes. The reason for this is that a space, in which the lower cover or the upper cover will be formed, must be provided by the fixing pins.

The fixing holes may be formed through the rotor cores from the tops to bottoms thereof, and insertion parts, which extend into the fixing holes so as to reach the fixing pins, may be formed at the upper cover or the lower cover located at the side opposite to the cover holes, in which case the cover holes need not be formed.

After injection molding, the insertion parts may extend into the fixing holes of the rotor cores, whereby the rotor cores may be more securely fixed in the rotor frame.

The rotor cores may be provided with fixing holes, into which fixing pins provided in the injection mold are inserted to fix the rotor cores in the mold, and the fixing pins may be integrally formed with the rotor frame by injection molding of the rotor frame.

That is, the fixing pins may be provided so as to support the rotor cores before and after injection molding. The fixing pins may be made of a plastic material in order to minimize the increase in weight of the rotor frame due to the fixing pins. In addition, a process of separating the fixing pins from the rotor frame after injection molding is omitted, whereby it is possible to very easily manufacture the rotor frame. Furthermore, support posts extending through the lower cover and the upper cover may be formed by the fixing pins and the insertion parts. Consequently, it is possible to more securely fix the rotor core than in the case in which only the insertion parts are provided.

The fixing pins may include fixing pin insertion parts, which are inserted into the fixing holes, and fixing pin support parts, which support the rotor cores in the mold. The radius of the fixing pin support parts may be larger than the radius of the fixing pin insertion parts.

One fixing hole may be formed in each of the rotor cores. Consequently, the rotor cores may be securely fixed in the mold, and the rotor cores may be securely fixed to the rotor frame even after injection molding.

Any one of the edge between the lower cover and side cover and the edge between the upper cover and side cover may be provided with edge holes, through which the magnets are exposed outward.

The number of edge holes may be equal to the number of magnets.

The edge holes may be formed as the result of support seats, for fixing the magnets in the mold in the radial direction of the rotor and the axial direction of the shaft, being separated from the rotor frame after injection molding of the rotor frame.

Portions of the bottom surfaces and the side surfaces of the magnets or portions of the top surfaces and the side surfaces of the magnets may be exposed outward through the edge holes.

The support seats may be provided to fix the magnets in position. Consequently, the magnets as well as the rotor cores may be fixed in the mold in position, whereby the rotor cores and the magnets may be stably fixed.

In addition, the support seats support the magnets in the radial direction while defining a space in which the upper cover or the lower cover will be formed. Consequently, the magnets and rotor cores may be very securely fixed in the radial direction as well as in the vertical direction and the circumferential direction.

In another aspect of the present invention, a rotor includes a plurality of rotor cores, a plurality of magnets magnetized such that magnetic flux is formed in the circumferential direction, the magnets and the rotor cores being alternately arranged in the circumferential direction, a coupler connected to a shaft, and a rotor frame including a coupler base connected to the coupler, an extension base extending from the coupler base in the radial direction, and a rotary base extending from the extension base in the axial direction of the shaft for supporting the rotor cores and the magnets while surrounding the rotor cores and the magnets, wherein the coupler base, the extension base, and the rotary base are integrally formed by injection molding, and the rotor frame is coupled to the coupler, the rotor cores, and the magnets, wherein the rotary base includes a lower cover for covering the bottom surfaces of the rotor cores and the magnets, an upper cover for covering the top surfaces of the rotor cores and the magnets, and a side cover extending from the lower cover to the upper cover for covering the inner circumferential surfaces or the outer circumferential surfaces of the rotor cores and the magnets that do not form gaps between the rotor cores and the stator and between the magnets and the stator, wherein the rotor cores are provided with fixing holes, into which fixing pins provided in an injection mold are inserted to fix the rotor cores in the mold during injection molding, and wherein the lower cover or the upper cover is provided with cover holes, through which the fixing holes are exposed outward.

The inner diameter of the cover holes may be larger than the inner diameter of the fixing holes such that portions of the top surfaces of the bottom surfaces of the rotor cores around the fixing holes are exposed outward through the cover holes.

The fixing holes may be formed through the rotor cores from the tops to bottoms thereof. Insertion parts, which extend into the fixing holes so as to reach the fixing pins, may be formed at the upper cover or the lower cover located at the side opposite to the cover holes, in which case the cover holes need not be formed.

The rotor cores may be formed such that the circumferential width of the rotor cores is gradually increased outward in the radial direction from the center of the rotor frame. The magnets may be formed such that the circumferential width of the magnets is uniform outward in the radial direction from the center of the rotor frame, whereby the magnets are in tight contact with adjacent rotor cores.

Any one of the edge between the lower cover and side cover and the edge between the upper cover and side cover may be provided with edge holes, through which the magnets are exposed outward.

The number of edge holes may be equal to the number of magnets. The edge holes may be formed as the result of support seats, for fixing the magnets in the mold in the radial direction of the rotor and the axial direction of the shaft, being separated from the rotor frame after injection molding of the rotor frame.

The cover holes and the edge holes may be provided to form a space in which the rotor cores and the magnets are fixed in the mold during injection molding and the molding material surrounds the rotor cores and the magnets.

In another aspect of the present invention, a rotor includes a plurality of rotor cores, a plurality of magnets magnetized such that magnetic flux is formed in the circumferential direction, the magnets and the rotor cores being alternately arranged in the circumferential direction, a coupler connected to a shaft, and a rotor frame including a coupler base connected to the coupler, an extension base extending from the coupler base in the radial direction, and a rotary base extending from the extension base in the axial direction of the shaft (substantially in the vertically upward direction) for supporting the rotor cores and the magnets while surrounding the rotor cores and the magnets, wherein the coupler base, the extension base, and the rotary base are integrally formed by injection molding, and the rotor frame is coupled to the coupler, the rotor cores, and the magnets, wherein the rotary base includes a lower cover for covering the bottom surfaces of the rotor cores and the magnets, an upper cover for covering the top surfaces of the rotor cores and the magnets, and a side cover extending from the lower cover to the upper cover for covering the outer circumferential surfaces of the rotor cores and the magnets that do not form gaps between the rotor cores and the stator and between the magnets and the stator, wherein the rotor cores are provided with fixing holes, into which fixing pins provided in an injection mold are inserted to fix the rotor cores in the mold during injection molding, wherein the lower cover or the upper cover is provided with cover holes, through which the fixing holes are exposed outward, and wherein insertion parts, which extend into the fixing holes so as to reach the fixing pins, may be formed at the upper cover or the lower cover located at the side opposite to the cover holes, in which case the cover holes need not be formed.

In another aspect of the present invention, a rotor includes a plurality of rotor cores, a plurality of magnets magnetized such that magnetic flux is formed in the circumferential direction, the magnets and the rotor cores being alternately arranged in the circumferential direction, a coupler connected to a shaft, and a rotor frame including a coupler base connected to the coupler, an extension base extending from the coupler base in the radial direction, and a rotary base extending from the extension base in the axial direction of the shaft (substantially in the vertically upward direction) for supporting the rotor cores and the magnets while surrounding the rotor cores and the magnets, wherein the coupler base, the extension base, and the rotary base are integrally formed by injection molding, and the rotor frame is coupled to the coupler, the rotor cores, and the magnets, wherein the rotary base includes a lower cover for covering the bottom surfaces of the rotor cores and the magnets, an upper cover for covering the top surfaces of the rotor cores and the magnets, and a side cover extending from the lower cover to the upper cover for covering the outer circumferential surfaces of the rotor cores and the magnets that do not form gaps between the rotor cores and the stator and between the magnets and the stator, wherein the rotor cores are provided with fixing holes, into which fixing pins provided in an injection mold are inserted to fix the rotor cores in the mold during injection molding, and wherein the fixing pins are integrally coupled to the rotor frame by injection molding of the rotor frame.

In the above embodiments, fixing pins for fixing the rotor cores and the magnets in the mold may be provided at the lower parts of the rotor cores and the magnets. In addition, the fixing pins may be further provided at the upper parts of the rotor cores and the magnets.

Some fixing pins (e.g. the lower fixing pins) may be inserted into the fixing holes of the rotor cores so as to fix the rotor cores, and some fixing pins (e.g. the upper fixing pins) may push the top surfaces of the rotor cores so as to fix the rotor cores. Cover holes may be formed in the upper cover and the lower cover of the lower frame by the fixing pins.

Portions of the top surfaces of the rotor cores may be exposed outside the rotor frame through the upper cover by the provision of some cover holes (e.g. cover holes formed by the upper fixing pins). Portions of the bottom surfaces of the rotor cores may be exposed outside the rotor frame through the lower cover by the provision of some cover holes (e.g. cover holes formed by the lower fixing pins).

The upper fixing pins may support the magnets as well as the rotor cores. That is, one upper fixing pin may simultaneously support one rotor core and a magnet adjacent to the rotor core. On upper fixing pin may simultaneously push a portion of the upper surface of one rotor core and a portion of the upper surface of a magnet adjacent to the rotor core.

The lower fixing pins may support the lower parts of the rotor cores, and the support seats may support the lower parts of the magnets.

Consequently, the upper and lower parts of the rotor cores and the magnets may be supported in the mold by the upper fixing pins, the lower fixing pins, and the support seats. As a result, the positions and attitudes of the rotor cores and the magnets may be accurately maintained.

In another aspect of the present invention, a rotor includes a plurality of rotor cores, a plurality of magnets magnetized such that magnetic flux is formed in the circumferential direction, the magnets and the rotor cores being alternately arranged in the circumferential direction, a coupler connected to a shaft, and a rotor frame formed by injection molding, the rotor frame being integrally coupled to the rotor cores, the magnets, and the coupler, wherein each of the rotor cores includes a pole shoe for defining a gap between each of the rotor cores and a stator and a rotor core body, and the rotor core body is provided with an outer aperture having a radial width greater than a circumferential width such that portions of side surfaces of corresponding ones of the magnets located at opposite sides of each of the rotor cores are exposed.

The outer aperture may be formed in each side of the rotor core body in the circumferential direction.

An inner aperture may be formed in the rotor core body between the outer apertures.

The inner aperture may include a first inner aperture provided inward in the radial direction and a second inner aperture provided outward in the radial direction.

The first inner aperture and the second inner aperture may be partitioned by a first core rib.

The second inner aperture may be partitioned from the rotor frame outward in the radial direction by a second core rib.

The circumferential widths of the first inner aperture and the second inner aperture may be larger than the radial widths of the first inner aperture and the second inner aperture.

The circumferential width of the first inner aperture may be smaller than the circumferential width of the second inner aperture.

The radial width of the second core rib may be larger than the radial width of the first core rib.

The outer aperture and the second inner aperture may be partitioned by the second core rib in the circumferential direction.

During injection molding of the rotor frame, support posts may be formed in the outer aperture, the first inner aperture, and the second inner aperture such that the support posts vertically extend through the outer aperture, the first inner aperture, and the second inner aperture to support each of the rotor cores.

A fixing hole, into which a fixing pin for fixing each of the rotor cores in the mold during injection molding is inserted, may be formed in the rotor core body between the pole shoe and the inner aperture.

After injection molding of the rotor frame, the fixing pin may be separated from the fixing hole, whereby a cover hole may be formed in the rotor frame.

The fixing pin may be integrally coupled to the rotor frame by injection molding of the rotor frame.

A core coupling part may be formed between the fixing hole and the inner aperture to form each of the rotor cores by stacking.

At least two core coupling parts maybe formed outside the fixing hole.

In a further aspect of the present invention, a rotor includes a plurality of rotor cores, a plurality of magnets magnetized such that magnetic flux is formed in the circumferential direction, the magnets and the rotor cores being alternately arranged in the circumferential direction, a coupler connected to a shaft, and a rotor frame formed by injection molding, the rotor frame being integrally coupled to the rotor cores, the magnets, and the coupler, wherein each of the rotor cores includes a pole shoe for defining a gap between each of the rotor cores and a stator and a rotor core body, and an outer aperture, by which the side surface formed at the radial tip of each of the magnets does not contact the rotor core body, is formed such that the magnetic flux from the side surfaces of the magnets is concentrated toward the stator in the radial direction via the rotor cores.

The outer aperture may be formed in each side of each of the rotor cores in the circumferential direction.

An inner aperture may be formed between the outer apertures, the inner aperture being partitioned from the outer apertures in the circumferential direction by a core rib, the inner aperture being provided in each of the rotor cores.

The radial width of the inner aperture may be larger than the thickness of the core rib.

The features of the above embodiments may be applied in combination with those of other embodiments unless the features are contradictory or exclusive.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE INVENTION

Hereinafter, exemplary embodiments of the present invention will be described in detail with reference to the accompanying drawings.

Figure 1:
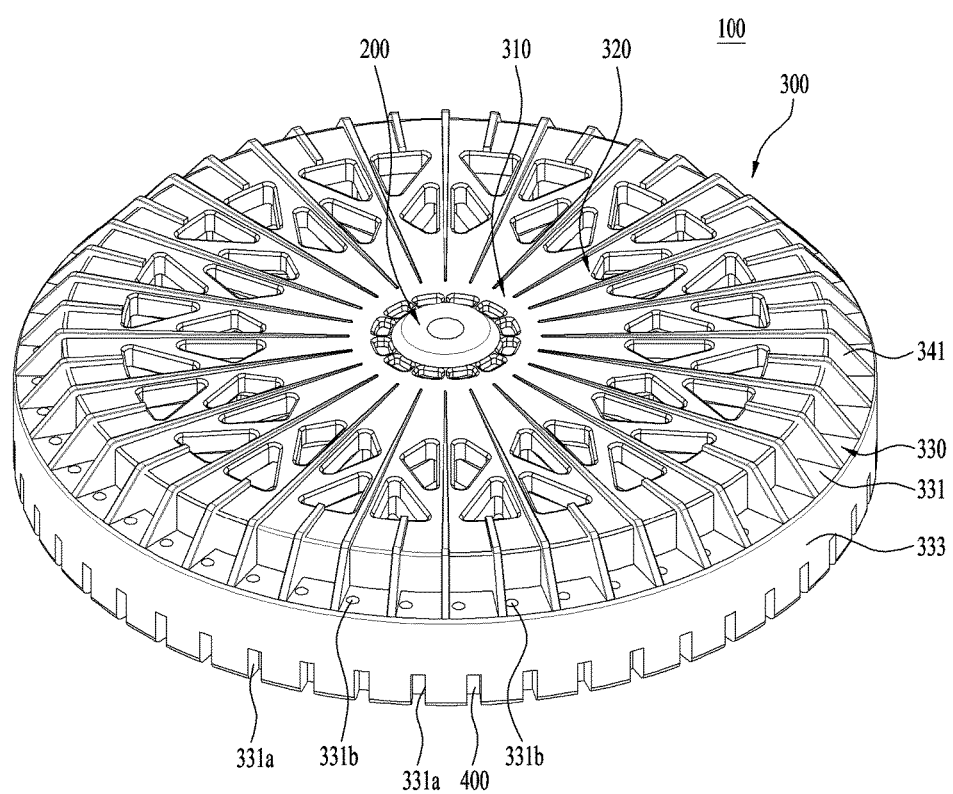
FIG. 1 is a view showing a rotor according to an embodiment of the present invention when viewed from above.

First, the structure of a rotor that may be applied to an embodiment of the present invention will be described with reference to FIGS. 1 and 2.

A rotor 100 includes a coupler 200 for transmitting rotational force from the rotor 100 to the outside. The coupler 200 may be connected to a shaft. When the shaft is connected to a drum of a washing machine, the rotational force is transmitted from the rotor 100 to the drum.

The coupler 200 may be made of a metal material for high torque and high speed transmission. The coupler 200 may be located in the central part of the rotor 100. In the case in which the rotor 100 is a rotor of the washing machine, the coupler 200 may be coupled to the shaft through a serrated structure. Consequently, the coupler 200 may also be called a serrated bushing.

For rotation of the rotor 100, a rotating field must be generated by electromagnetic action between the rotor 100 and a stator. To this end, the rotor 100 includes a rotor core 500 and a magnet 400.

In this embodiment, the rotor core 500 and the magnet 400 are disposed so as to be spaced apart from the center of the rotor 100, i.e. the coupler 200, in the radial direction. Consequently, a structure for simultaneously rotating the rotor core 500 and the magnet 400 and rotating the coupler 200 is needed. That is, a structure for supporting and integrally coupling the rotor core 500, the magnet 400, and the coupler 200 is needed. To this end, in this embodiment, the rotor 100 may include a rotor frame 300.

The rotor core 500, which forms a magnetic flux path, may be formed by stacking iron sheets. Consequently, the rotor core 500 may be made of a magnetic metal material. The magnet 400 may be made of various materials. Specifically, the magnet 400 may be a ferrite magnet. That is, the magnet 400 may be a permanent magnet.

The weight of the rotor 100 is increased due to the weight of the rotor core 500 and the magnet 400. In addition, it is required for the rotor frame 300, which simultaneously supports the coupler 200, the rotor core 500, and the magnet 400, to have sufficient rigidity. As a result, the weight of the rotor 100 is further increased due to the weight of the rotor frame 300.

Consequently, it is difficult to reduce the weight of the rotor 100 while satisfying high efficiency, high performance, and required rigidity. This means that it is very desirable to minimize the weight of the rotor 100 as long as the given conditions are satisfied.

In this embodiment, the rotor frame 300 may be made of a plastic material in order to prevent the increase in weight of the rotor 100 due to the rotor frame 300. That is, the rotor frame 300 may be formed by injection molding. The rotor frame 300 may be made of a plastic material not only to reduce the weight of the rotor frame 300 but also to reduce the leakage of magnetic flux through the rotor frame 300. The reason for this is that magnetic flux readily leaks through a conventional rotor frame, which is made of an iron plate.

In addition, the coupler 200, the rotor core 500, and the magnet 400 may be fixed to the rotor frame 300 at the time that the rotor frame 300 is injection-molded. That is, the coupler 200, the rotor core 500, and the magnet 400 may be inserted into an injection mold, and then a molding material, such as a plastic material, for forming the rotor frame 300 is injected into the injection mold. In other words, the rotor may be formed so as to have a single body by insert molding. Consequently, an additional structure or process for fixing the magnet 400, the rotor core 500, and the coupler 200 may not be required. As a result, the rotor 100 may be easily manufactured.

The rotor frame 300 may include a coupler base 310 connected to the coupler 200, an extension base 320 extending from the coupler base 310 in the radial direction, and a rotary base 330 extending from the extension base 320 in the axial direction of the shaft.

The rotary base 330 may support the rotor core 500 and the magnet 400 while surrounding the rotor core 500 and the magnet 400.

The rotary base 330 may extend from the radial tip of the extension base 320 substantially in the vertical direction. When the rotor frame 300 is in the state shown in FIG. 1, the rotary base 330 may extend vertically downward. Consequently, the coupler base 310 and the extension base 320 may define the top surface of the rotor frame 300, and the rotary base 330 may define the side surface of the rotor frame 300. The bottom surface of the rotor frame 300 may have a flat circular container shape due to the bases 310, 320, and 330.

Figure 3:
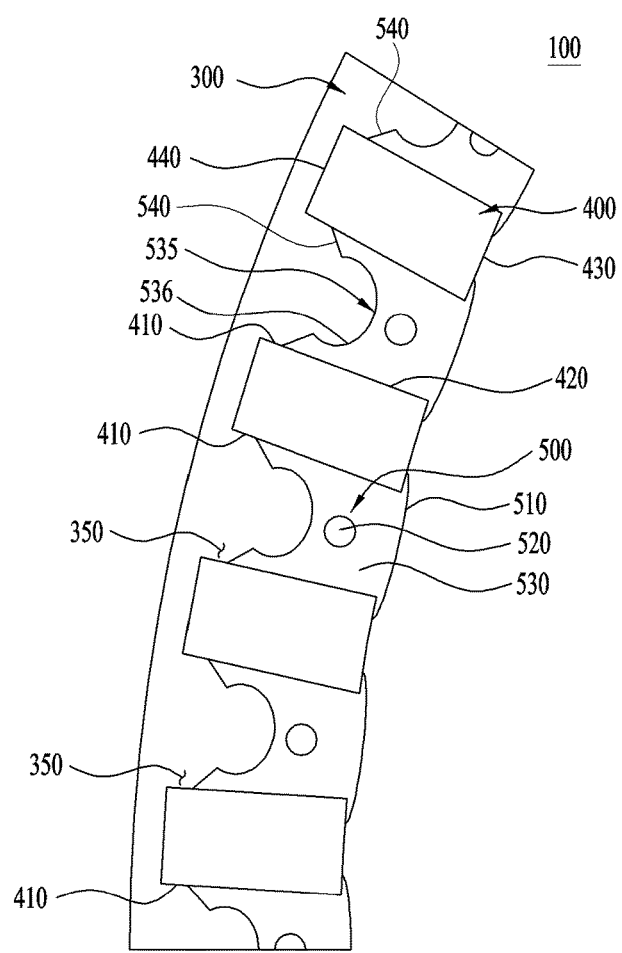
FIG. 3 is a partial sectional view showing a rotor including a rotor core according to an embodiment of the present invention.

Hereinafter, an embodiment related to the structure of the rotor core 500 and the arrangement between the rotor core 500 and the magnet 400 will be described with reference to FIG. 3. FIG. 3 shows an embodiment of an outer rotor. In addition, FIG. 3 is a partial horizontal sectional view of the rotor core 500 and the magnet 400.

In this embodiment, the rotor 100 may include a plurality of rotor cores 500 and a plurality of magnets 400. The rotor cores 500 may be individually formed. In addition, the magnets 400 may be individually formed. Consequently, the rotor cores 500 may be rotor core segments, and the magnets 400 may be magnet segments.

Each of the magnets 400 may be magnetized so as to have a single magnetic pole. The magnets 400 and the rotor cores 500 may be alternately arranged in the circumferential direction of the rotor 100. For example, 48 rotor cores (rotor core segments) and 48 magnets (magnet segments) may be provided.

The magnets 400 may generate magnetic flux in various directions. However, magnetic flux for rotating the rotor may be directed to the stator. For example, in the case in which the rotor is an outer rotor, radial magnetic flux directed to the stator, which is located inside the rotor in the radial direction, may be effective. The greater the magnetic flux directed outward in the radial direction of the rotor, therefore, the lower the efficiency of the motor.

Magnetic flux is generated by a magnetic material. When the magnetic flux encounters a non-magnetic material during the flow of the magnetic flux, the magnetic flux is distorted. That is, the non-magnetic material may act as magnetic flux resistance, which may be a flux barrier. Consequently, the effective magnetic flux of the magnets 400 may be increased through the magnetic flux resistance.

In this embodiment, the rotor cores 500 may be configured so as to concentrate magnetic flux toward the stator. For example, the rotor cores 500 may be configured so as to concentrate magnetic flux inward in the radial direction. In addition, the weight of the rotor cores 500 may be reduced in order to reduce the weight of the rotor 100 and to reduce material costs.

Each magnet 400 may be configured such that the radial width of each magnet 400 is larger than the circumferential width thereof. In the case in which the rotational directions constituted by the radial centers of the magnets 400 are the same, therefore, a relatively large number of magnets 400 may be provided. In addition, the area of circumferential side surfaces 410 and 420 of each magnet 400 may be larger than the area of radial side surfaces (a radial inner side surface 430 and a radial outer side surface 440) of each magnet 400. Consequently, the magnets 400 may concentrate magnetic flux to adjacent rotor cores 500.

As shown in FIG. 3, each rotor core 500 includes a pole shoe 510 and a rotor core body 530. The pole shoe 510 is a part that defines a gap between the rotor core and the stator. The pole shoe 510 may extend from the tip of the rotor core body 530 to the circumferentially opposed sides of the rotor core body 530. In the case in which the rotor is an outer rotor, the pole shoe 510 may extend from the radial inner tip of the rotor core body 530 to the circumferentially opposed sides of the rotor core body 530. The pole shoe 510 may be formed so as to cover a portion of the radial inner side surface 430 of each adjacent magnet 400.

Each rotor core 500 may include a depression 535 formed in the side opposite to the pole shoe 510 in the radial direction (e.g. in the outside in the radial direction). That is, the depression 535 may be formed in the rotor core body 530. In the case in which the rotor is an outer rotor, the depression 535 may be formed so as to be depressed inward in the radial direction. Consequently, the volume of each rotor core 500 is reduced by the depression 535, thereby reducing the weight of the rotor cores 500 and material costs.

The depression 535 may be formed so as to expose a portion of the side surface of each magnet 400. That is, the depression 535 may be formed so as to expose a portion of the circumferential side surface of each magnet 400. In other words, an exposed surface 410 may be formed at the radial tip of the side surface of each magnet 400 by the depression 535.

The exposed surface 410 may define an aperture 350. In other words, the exposed surface 410 may be a non-contact surface, which does not contact each rotor core 500. Consequently, a portion of the side surface of each magnet 400 defines a contact surface 420, which contacts a corresponding rotor core 500, and a portion of the side surface of each magnet 400 defines the exposed surface 410. The exposed surface 410 contacts the rotor frame 300, which is made of a plastic material. That is, a portion of the rotor frame 300 fills the aperture 350. Consequently, the rotor frame 300 has a magnetic flux resistance function. That is, the aperture 350 may be formed from the exposed surface 410 in the circumferential direction.

The radial width of the exposed surface 410 may be smaller than the radial width of the contact surface 420. Consequently, magnetic flux is prevented from flowing through the exposed surface 410 in the circumferential direction. In other words, magnetic flux flows to the contact surface 420, rather than to the exposed surface 410. As a result, the magnetic flux may be concentrated inward in the radial direction.

The depression 535 may be formed so as to be symmetric in the circumferential direction because of the characteristics of the rotor. Consequently, uniform magnetic flux may be formed at opposite sides in the circumferential direction. In addition, vibration may be reduced, since the depression 535 has a symmetric shape.

In particular, each rotor core is not located in the circumferential direction between the exposed surface 410 of one magnet and the exposed surface 410 of an adjacent magnet. That is, the apertures may be successively formed in the circumferential direction. In other words, the depression 535 may be formed so as to be further depressed in the radial direction between the exposed surfaces facing each other in the circumferential direction. That is, the aperture defined by the exposed surfaces 410 may extend further inward in the radial direction. Consequently, the aperture 350 is formed between two adjacent magnets so as to have a radial width equal to or larger than the radial width of each exposed surface 410.

The aperture 350 may be configured such that the radial width of the aperture 350 is the largest at the middle between adjacent magnets and is gradually decreased in the circumferential direction. The aperture 350 may have the smallest radial width at the exposed surface 410. Consequently, it is possible to greatly reduce the generation of magnetic flux from the exposed surface in the circumferential direction.

Each rotor core 500 may be formed by stacking. To this end, the rotor core body 530 may be provided with a core coupling part 520 for stacking. In addition, the core coupling part 520 may be provided between the pole shoe 510 and the depression 535.

The core coupling part 520 may be formed in the middle of each rotor core 500 in the circumferential direction. In addition, the inner diameter of the core coupling part 520 may be smaller than the circumferential width and the radial width of the depression 535. The reason for this is that the core coupling part 520 has a function of reducing the area of each rotor core through which magnetic flux flows as well as a magnetic flux resistance function. If the inner diameter of the core coupling part 520 is increased, the magnetic flux flowing adjacent to the core coupling part 520 is saturated, with the result that the efficiency of each rotor core may be lowered.

Some of the molding material may be injected into the core coupling part 520. As a result, each rotor core 500 may be securely fixed to the rotor frame 300.

The depression 535 may be formed so as to fix each rotor core 500 to the rotor frame 300. That is, a portion of the rotor frame 300 may be inserted into the depression 535 so as to fix and support each rotor core 500. In other words, at least some of the molding material for forming the rotor frame may be introduced into the depression 535 during injection molding.

Meanwhile, the depression 535 may be formed so as to support each rotor core 500 in the mold. The reason for this is that each rotor core 500 must be located in position during injection molding. To this end, the depression 535 may include a fixing hole 536, into which a fixing pin 660 (see FIG. 5) for fixing each rotor core 500 in the mold during injection molding is inserted. That is, the fixing hole 536 may be a portion of the depression 535.

The fixing pin 660 may have a circular section. Correspondingly, at least a portion of the fixing hole 536 may be circular.

The fixing pin, which is provided in the mold, may be perpendicularly inserted into each rotor core 500. Subsequently, each rotor core 500 is fixed by the fixing pin. Consequently, the inner circumference of the fixing hole may have an angle of more than 180 degrees. That is, the fixing hole may be formed so as to surround the fixing pin over an angular range of more than 180 degrees. As a result, each rotor core 500 is prevented from being separated in the radial direction of the fixing pin.

The depression 535 may be formed over the entire height of each rotor core 500. That is, the depression 535 may be formed so as to vertically extend through each rotor core 500. Of course, the fixing hole 536 may be formed so as to vertically extend through each rotor core 500. However, it is not necessary for the fixing pin to be inserted into the depression 535, particularly the fixing hole 536, over the entire height thereof. That is, the fixing pin may be inserted into the fixing hole 536 only to a predetermined height from the bottom of each rotor core 500. For example, the fixing pin may be inserted into the fixing hole 536 to only half of the height of each rotor core 500. Consequently, the molding material is not introduced into a portion of the fixing hole corresponding to the fixing pin. On the other hand, the molding material may be introduced into a portion of the fixing hole, into which the fixing pin is not inserted. Consequently, a portion of the fixing hole 536 is filled with the molding material to form a portion of the rotor frame.

The depression 535 may include incision parts 540 (도면에 기재되지 않았습니다) formed at opposite sides thereof. The fixing hole 536 may be formed so as to be further depressed from the incision parts 540 in the radial direction.

The incision parts 540 may be formed so as to be inclined in the radial direction. Consequently, the incision parts 540 may be inclined incision parts 540. The circumferential width of each rotor core 500 is gradually increased inward in the radial direction by the incision parts 540. As a result, magnetic flux may be stably concentrated inward in the radial direction. In addition, the molding material may be more smoothly introduced inward in the radial direction along the inclined incision parts 540.

Meanwhile, the fixing pin must be prevented from falling between the incision parts 540. Consequently, the circumferential distance between the incision parts 540 at connections with the fixing hole 536 may be smaller than the maximum diameter (inner diameter) of the fixing hole 536.

In this embodiment, as previously described, the molding material may be injected into the depression excluding a portion of the depression (a portion of the fixing hole in which the fixing pin is inserted). The depression is open outward in the radial direction. Consequently, the molding material is injected from the outside in the radial direction to form a side wall of each rotor core 500, specifically the radial outer side surface 333 of the rotary base 330.

In this embodiment, however, a large amount of molding material is injected into the depression 535. That is, the injection thickness of the depression 535 is greater than those of other parts. As a result, a portion of the rotor frame corresponding to the depression 535 may shrink when the molding material is cooled after the injection molding is completed. In other words, the side surface of the rotor frame may be nonuniform. Of course, such nonuniformity of the rotor frame may not deteriorate the performance of the rotor. Nevertheless, the nonuniform surface of the rotor frame may be regarded as a product defect.

Figure 4:
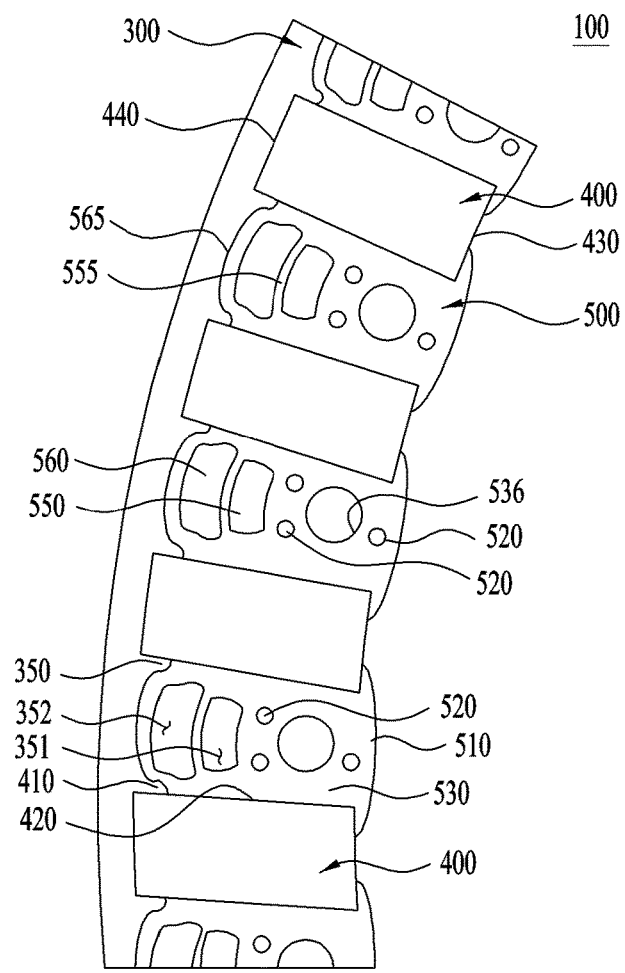
FIG. 4 is a partial sectional view showing a rotor including a rotor core according to another embodiment of the present invention.

Hereinafter, another embodiment related to the structure of the rotor core 500 and the arrangement between the rotor core 500 and the magnet 400 will be described with reference to FIG. 4. FIG. 4 shows another embodiment of an outer rotor. In addition, FIG. 4 is a partial horizontal sectional view of the rotor core 500 and the magnet 400. A detailed description of the construction of this embodiment that is identical to that of the previous embodiment will be omitted.

In the rotor core 500 according to this embodiment, magnetic flux may be concentrated in the effective magnetic flux direction, in the same manner as in the rotor core 500 according to the previous embodiment. Furthermore, in this embodiment, injection molding efficiency may be higher than in the previous embodiment, and the rotor core 500 may be more securely fixed to the rotor frame than in the previous embodiment.

In this embodiment, a core rib is further included in the depression of the embodiment shown in FIG. 3. That is, one side of the depression shown in FIG. 3 is not surrounded by the core. In this embodiment, however, the depression is completely surrounded by the core. That is, the aperture may be closed by a core rib formed at one side of the depression. A single closed aperture may be provided. Alternatively, a plurality of closed apertures may be provided. The apertures may be arranged in the radial direction.

The core rib may extend in the circumferential direction.

Each rotor core body 530 may contact the magnets 400 at circumferentially opposed sides thereof. A portion of each circumferential side of the rotor core body 530 may not contact a corresponding one of the magnets 400. For example, in the case in which the rotor is an outer rotor, a portion of each radial outer side surface of the rotor core body 530 may not contact a corresponding one of the magnets 400, thereby forming an aperture 350.

In this embodiment, the aperture 350 is formed between each magnet 400 and a corresponding rotor core 500. The aperture 350 is formed in the outside of the rotor core 500. Consequently, the aperture 350 may be an outer aperture. The outer aperture is formed in each side of the rotor core 500.

The outer aperture may be defined by the shape of the rotor core body 530. Each circumferential tip of the rotor core body 530 may be depressed inward in the radial direction, whereby the outer aperture may be formed.

The circumferential width of the outer aperture may be smaller than the radial width of the outer aperture. For example, in the case in which the circumferential width of the outer aperture is about 1 mm, the radial width of the outer aperture may be about 3.2 mm. In other words, a length of about 3.2 mm of the circumferential side surface of the magnet 400 may not contact the rotor core 500, thus forming the aperture.

Inner apertures 550 and 560 may be formed between the opposite outer apertures 350. The inner apertures 550 and 560 may be located in the rotor core body 530.

The inner apertures 550 and 560 may include a first inner aperture 550 and a second inner aperture 560. The first inner aperture 550 may be located further inward than the second inner aperture 560 in the radial direction.

The first inner aperture 550 and the second inner aperture 560 may be partitioned from each other by a first core rib 555. The second inner aperture 560 may be partitioned from the outside by a second core rib 565.

The radial width of the first core rib 555 may be larger than the radial width of the second core rib 565. That is, the radial width of the second core rib 565 may be minimized. The reason for this is that the second core rib 565 is provided to form an aperture through which magnetic flux does not flow. In the case in which the radial width of the second core rib 565 is large, magnetic flux is formed through the second core rib 565, which may reduce efficiency.

Consequently, the second core rib 565 may have the minimum radial width that is sufficient to prevent damage by injection pressure and blanking. For example, the radial width of the first core rib 555 may be about 1.5 mm, and the radial width of the second core rib 565 may be about 1.0 mm or less.

Meanwhile, the second core rib 565 may extend from the circumferential center thereof to the circumferentially opposed sides thereof. The apertures 350 may be formed in the circumferentially opposed sides of the second core rib 565. The second core rib 565 may be formed so as to have an approximate arc shape. In addition, the second core rib 565 may have the maximum radius at the circumferential center thereof. This means that the outer apertures 350 formed in the opposite sides of each rotor core 500 and the second inner aperture 560 are partitioned from each other by the second core rib 565. That is, this means that the radially outermost side of the second inner aperture 560 is located further outward in the radial direction than the radially innermost side of each outer aperture 350. Even when magnetic flux is formed in the outer apertures 350 in the circumferential direction, therefore, magnetic flux in the circumferential direction may be greatly reduced by the second core rib 565 and the second inner aperture 560, which are relatively narrow. Consequently, magnetic flux may be concentrated inward in the radial direction.

The width or thickness of the second core rib 565 may be uniform. In the case in which the second core rib 565 is arc-shaped, the width or thickness of the second core rib 565 at the circumferential center thereof may be defined as the radial width or thickness of the second core rib 565. In addition, the width or thickness of the second core rib 565 at the circumferentially opposed sides thereof may be defined as the circumferential width or thickness of the second core rib 565.

The first core rib 555 and the second core rib 565 extend substantially in the circumferential direction. Consequently, magnetic flux flowing in the ribs may be leaking magnetic flux, rather than radial magnetic flux. For this reason, the ribs may have a minimum thickness. The reason for this is that the smaller the width of the ribs, the smaller the space in which magnetic flux can flow.

A portion of the rotor frame 300 fills the first inner aperture 550 and the second inner aperture 560. Consequently, the first inner aperture 550 and the second inner aperture 560 each have a magnetic flux resistance function. The molding material fills the first inner aperture 550 from the top to bottom of the rotor core 500. In the same manner, the molding material fills the second inner aperture 560 from the top to bottom of the rotor core 500.

Consequently, support posts 351 and 352 may be respectively formed in the first inner aperture 550 and the second inner aperture 560 to support the rotor core while forming a portion of the rotor frame. The support posts may more securely support the rotor core 500 inside the rotor frame. Consequently, the rotor core 500 may be supported in the rotor frame via at least two adjacent support points.

In the case in which the first core rib 555 and the second core rib 565 are omitted, this embodiment may be similar to the embodiment shown in FIG. 3. In this embodiment, however, the space corresponding to the depression 335 shown in FIG. 3 is partitioned into at least two spaces. That is, the space corresponding to the depression 335 is partitioned in the radial direction by the first core rib 555, and the space outside the depression 335 in the radial direction may be partitioned by the second core rib 565. The molding material may be injected into the partitioned spaces. That is, the molding material may be injected into a plurality of partitioned spaces, rather than into a single large space. As a result, injection molding efficiency may be improved.

Meanwhile, the apertures 550 and 560, which are respectively formed by the first core rib 555 and the second core rib 565, may reduce the volume of the rotor core 500. In addition, the apertures 550 and 560 may have a magnetic flux resistance function. Since the apertures 550 and 560 are formed outside in the radial direction, magnetic flux generated by the magnets 400 may be concentrated inward in the radial direction. Of course, in the case in which the rotor is an inner rotor, magnet flux generated by the magnets 400 may be concentrated outward in the radial direction.

The molding material is introduced into the apertures 550 and 560. For this reason, it is necessary for the apertures 550 and 560 not to be deformed during injection molding. This means that the core ribs 555 and 565 must withstand injection pressure and maintain rigidity during injection molding. Consequently, the reduction in the thickness (the radial width) of the core ribs is limited.

Specifically, the thickness of the core ribs may be 1.5 mm or less in consideration of magnetic flux saturation. More specifically, the thickness of the core ribs may be 1.0 mm or less. Blanking is performed to form the rotor core. At this time, the core ribs must not be damaged. Consequently, the thickness of the core ribs may be 0.5 mm in consideration of blanking. Of course, the thickness of the core ribs may be reduced further as long as the blanking process is improved or the material for the rotor core is improved.

The radial outer tip of the second core rib 565 may be formed so as to have the same radius as the radial outer tip of the magnet. For example, the second core rib 565 may be formed in the shape of an arc that is convex outward in the radial direction. In the same manner, the first core rib 555 may be formed in the shape of an arc that is convex outward in the radial direction.

The circumferential width of the first inner aperture 550 may be smaller than the circumferential width of the second inner aperture 560. In addition, the radial width of the first inner aperture 550 may be smaller than the radial width of the second inner aperture 560. Furthermore, the circumferential width of each of the apertures 550 and 560 may be larger than the radial width of each of the apertures 550 and 560.

As a result, it is possible to greatly prevent magnetic flux from being formed at the magnet 400, particularly the radial tip of the magnet 400, in the circumferential direction. That is, it is possible to concentrate the magnetic flux from the magnet 400 inward in the radial direction through the rotor core 500.

Meanwhile, the molding material is introduced into the first inner aperture 550 and the second inner aperture 560 during injection molding of the rotor frame. That is, the molding material is introduced into the first inner aperture 550 and the second inner aperture 560 from the top to bottom of the first inner aperture 550 and the second inner aperture 560. The molding material, which becomes a portion of the rotor frame after injection molding, performs a function of supporting the rotor core 500. Consequently, the rotor frame 300 includes support posts 351 and 352 extending through the apertures 550 and 560 to support the rotor core 500.

The support posts 351 and 352 perform a magnetic flux resistance function and a function of supporting the rotor core 500 such that the rotor core 500 cannot be separated from the rotor frame 300.

A fixing hole 536 may be formed in the rotor core 500. The fixing hole 536 may be located inside the first inner aperture 550 in the radial direction. In addition, the fixing hole 536 may be circular.

A fixing pin for supporting the rotor core 500 in the mold during injection molding of the rotor frame is inserted into the fixing hole 536.

The circumferential width of the fixing hole 536 may be smaller than the circumferential width of the first inner aperture 550. If the circumferential width of the fixing hole 536 is larger than the circumferential width of the first inner aperture 550, the radial width of the rotor core 500 at the opposite sides of the fixing hole 536 may be greatly reduced. In this case, magnetic flux saturation may occur.

A core coupling part 520 may be formed so as to be adjacent to the fixing hole 536. A plurality of core coupling parts 520 may be formed around the fixing hole 536. In particular, one fixing hole 536 may be formed in the circumferential center of the rotor core inside the fixing hole 536 in the radial direction, and two fixing holes 536 may be formed in the left and right sides of the fixing hole 536 in the circumferential direction.

In this embodiment, it is difficult to form the core coupling parts 520 in the outside of the rotor core 500 in the radial direction, since the inner apertures 550 and 560 are formed in the outside of the rotor core 500 in the radial direction. In particular, it is difficult to form the core coupling parts 520 in the first core rib 555 and the second core rib 565, since the widths of the first core rib 555 and the second core rib 565 are small. Consequently, the core coupling parts 520 may be formed around the fixing hole 537 inside the first inner aperture 550 in the radial direction.

Hereinafter, the fixing structure of the magnets and the rotor cores and the structure of the rotor frame during injection molding of the rotor frame will be described in detail with reference to FIGS. 5 and 6. The rotor frame may be injection-molded as shown in FIG. 1. The upper and lower parts of the rotor 100 may be defined based on the state of the rotor 100 shown in FIG. 1 (the overturned state of the rotor). In addition, FIGS. 5 and 6 show an example in which the embodiment of the rotor cores shown in FIG. 3 is applied.

Figure 5:
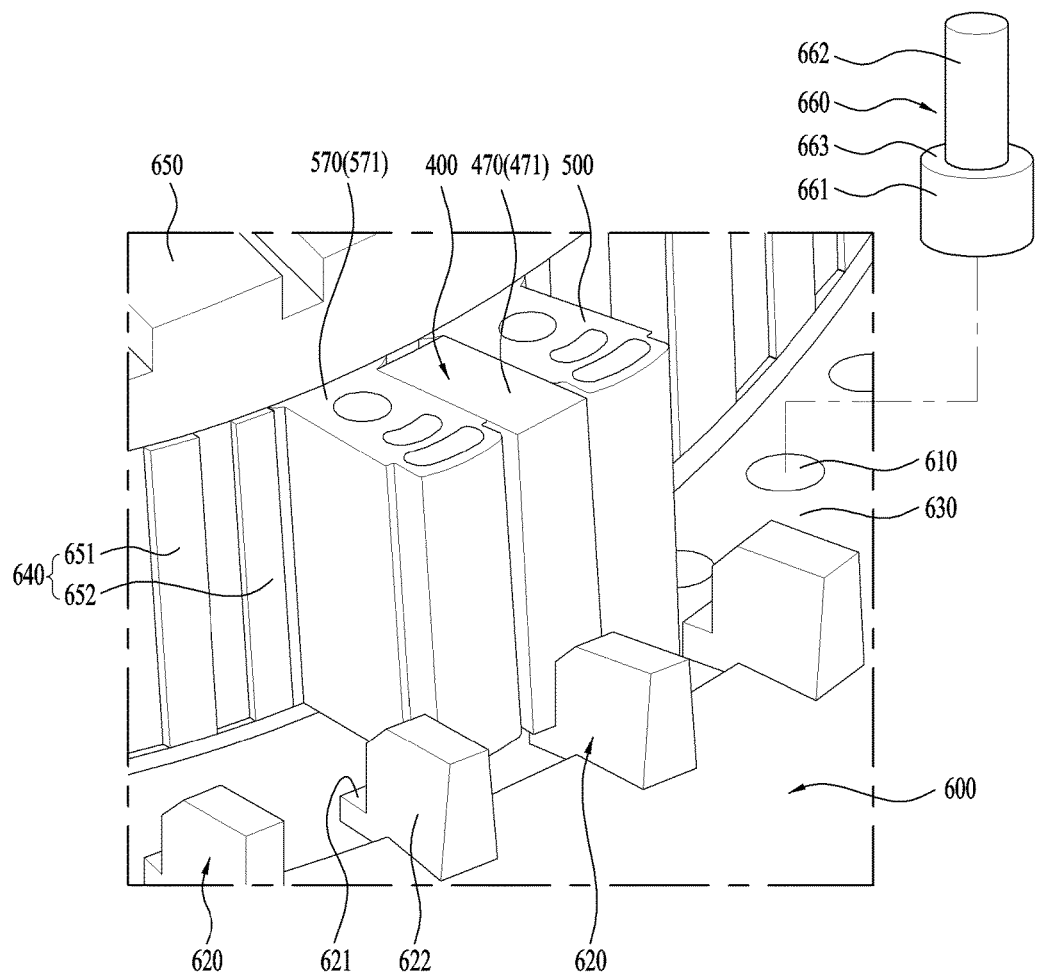
FIG. 5 is a view showing the rotor core of FIG. 4 inserted into an injection mold for a rotor frame.
Figure 6:
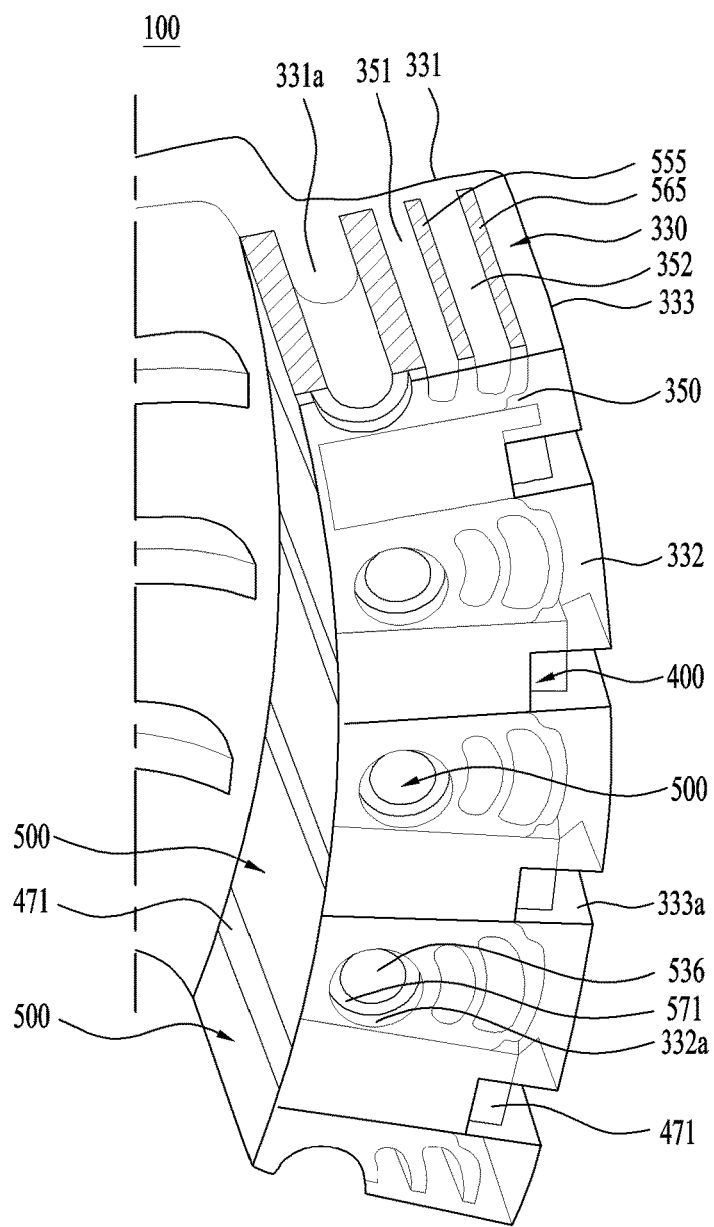
FIG. 6 is a partial sectional view showing a rotary base in the rotor frame.

FIG. 5 shows the state in which rotor cores 500 and magnets 400 are inserted into a mold, particularly a lower mold 600. That is, the rotor cores 500 and the magnets 400 are alternately inserted into the mold in the circumferential direction. After the rotor cores 500 and the magnets 400 are inserted, an upper mold may be coupled to the lower mold 600, and then injection molding may be performed.

During injection molding, the rotor cores 500 and the magnets 400 must be prevented from moving in the mold. The axial movement of the rotor cores 500 and the magnets 400 may be prevented by the mold. In addition, the circumferential and radial movement of the rotor cores 500 and the magnets 400 must be prevented. To this end, the mold may be provided with fixing pins for fixing the rotor cores 500 in the mold. In addition, the mold may be provided with support seats 620 for supporting the magnets 400.

Specifically, the rotor cores 500 and the magnets 400 may be surrounded by the rotor frame 300. That is, top surfaces 570 and 470 and bottom surfaces 571 and 471 of the rotor cores 500 and the magnets 400 may be covered by the rotor frame 300. In addition, the radial outer side surfaces 440 of the magnets 400, at which no gap is formed, may be covered by the rotor frame 300. Of course, in the case in which the rotor is an inner rotor, the radial inner side surfaces of the magnets 400, at which no gap is formed, may be covered by the rotor frame 300.

First, the rotor cores 500 and the magnets 400 are inserted into the mold 600 such that the radial inner side surfaces of the rotor cores 500 and the magnets 400 contact a gap surface 640 of the mold 600. Consequently, substantially no molding material is injected into the radial inner side surfaces of the rotor cores 500 and the magnets 400. In addition, the rotor cores 500 and the magnets 400 are prevented from moving inward in the radial direction in the mold 600 by the gap surface 640 of the mold 600.

In particular, the rotor cores 500 may be located further inward in the radial direction than the magnet 400 due to the pole shoes thereof. Consequently, some molding material may be injected between the rotor cores 500 and the magnets 400 at positions adjacent to the gap. However, the gap surface 640 of the mold 600 may be formed as rotor core gap surfaces 561 and magnet gap surfaces 652 such that the inner circumferential surfaces of the rotor cores 500 and the magnets 400 in the radial direction come into tight contact with the mold 600. That is, the magnet gap surfaces 652 may protrude further in the radial direction than the rotor core gap surfaces 561 so as to form the gap more uniformly.

The rotor cores 500 and the magnets 400 are inserted into the mold such that the bottom surfaces 571 of the rotor cores 500 and the bottom surfaces 471 of the magnets 400 are spaced apart from a first bottom surface 630 of the lower mold 600 by a predetermined height. The molding material is injected into the space between the bottom surfaces 571 and the first bottom surface 630 and between the bottom surfaces 471 and the first bottom surface 630 such that the rotor frame covers the bottom surfaces of the rotor cores 500 and the magnets 400.

In addition, a space is defined on the top surfaces 570 of the rotor cores 500 and the top surfaces 470 and the radial outer side surfaces of the magnets 400. That is, a space is defined between the lower mold 600 and the upper mold. The molding material is injected into the space such that the rotor frame covers the top surfaces of the rotor cores 500 and the top surfaces and the radial outer side surfaces of the magnets 400.

The lower mold 600 may be provided with fixing pin holes 610, into which fixing pins 660 may be inserted. The fixing pins 660 may be inserted into the fixing holes 536 of the rotor cores 500. The rotor cores 500 may be fixed in the mold by the fixing pins. Here, the shape of the fixing pins is critical. The reason for this is that the fixing pins 660 perform a function of spacing the rotor cores 500 upward from the first bottom surface 630 as well as a function of fixing the rotor cores 500.

A second bottom surface 650 is formed at the upper part of the lower mold 600. The second bottom surface 650 defines the coupler base 410 and the extension base 320 of the rotor frame 300. In particular, the second bottom surface 650 defines a reference bottom surface 301 of the rotor frame 300. The second bottom surface 650 may be provided with a plurality of slots. The slots are paths through which the molding material flows to form ribs.

The fixing pins 660 may be formed to have a cylindrical shape. In addition, each fixing pin 660 may include lower and upper cylindrical parts 661 and 662 having different radii. The lower cylindrical part 661 is inserted into a corresponding one of the fixing pin holes 610, and the upper cylindrical part 662 is inserted into the fixing hole 536 of a corresponding one of the rotor cores 500. The radius of the lower cylindrical part 661 of each fixing pin 660 may be larger than the radius of the upper cylindrical part 662 of each fixing pin 660. Consequently, a support surface 663 may be formed between the lower cylindrical part 661 and the upper cylindrical part 662. That is, a support surface 663 for supporting the bottom surface of each rotor core 500 is formed on the top surface of the lower cylindrical part 661. In other words, the outer diameter of the lower cylindrical part 661 of each fixing pin 660 may be larger than the inner diameter of the fixing hole 536 of a corresponding one of the rotor cores 500, and the outer diameter of the upper cylindrical part 662 of each fixing pin 660 may be smaller than the inner diameter of the fixing hole 536 of a corresponding one of the rotor cores 500.

When the fixing pin 660 is inserted into the fixing pin hole 610, the support surface 663 of the fixing pin 660 protrudes upward from the first bottom surface 630. When the rotor core 500 is located on the support surface 663, therefore, the bottom surface of the rotor core 500 is vertically spaced apart from the first bottom surface 630. The molding material is injected into the space to form the bottom surface 332 of the rotary base 330.

Meanwhile, the fixing pin hole 610 is formed in only a portion of the first bottom surface 630. When the fixing pin is inserted into the fixing pin hole 610, therefore, the molding material is not injected into the portion of the fixing pin hole 610 corresponding to the fixing pin. As a result, a cover hole 332a corresponding to the fixing pin 660 is formed in the bottom surface 332 of the rotary base. The reason for this is that the fixing pin is separated from the rotor frame after injection molding.

A portion of the bottom surface of each rotor core 500 and the fixing hole 536 are exposed outward through the cover hole 332a due to the difference in radius between the fixing pin 660 and the fixing hole 536.

The fixing pins 660 may be separably coupled to the mold 600. Alternatively, the fixing pins 660 may be integrally formed at the mold 600. The rotor cores 500 may be stably supported and fixed in the mold 600 by the fixing pins 660. The fixing pins 660 may be inserted into the respective rotor cores 500.

It is very important to support the magnets 400 in the mold as well as to support the rotor cores 500 in the mold. To this end, the mold 600 may be provided with support seats 620.

The support seats 620 may support the bottom surfaces and the radial outer side surfaces of the magnets 400. In addition, the support seats 620 may be configured such that the bottom surfaces of the magnets 400 are located higher than the first bottom surface 630. The bottom surfaces of the rotor cores 500 and the bottom surfaces of the magnets 400 may be located at the same level by the fixing pins 660 and the support seats 620. That is, the bottom surfaces of the rotor cores 500 and the bottom surfaces of the magnets 400 may have the same height.

The support seats 620 may limit the movement of the magnets outward in the radial direction. When the bottom surfaces of the magnets 400 are supported by the location surfaces 621 of the support seats 620, the radial outer side surfaces of the magnets 400 may be supported by support parts 622 provided outside the location surfaces 621 in the radial direction.

Each of the support parts 622 of the support seats 620 may have a trapezoidal sectional shape. That is, the upper width of each support part 622 may be larger than the lower width of each support part 622. Consequently, the rotor frames may be more easily separated from the mold after injection molding.

After a plurality of magnets 400 and a plurality of rotor cores 500 are inserted into the mold 500 through the fixing pins 660 and the support seats 620, injection molding may be performed.

As the result of injection molding, the rotary frame 330 surrounds the rotor cores and the magnets excluding the inner circumferential surfaces of the rotor cores and the magnets, which define gaps between the rotor cores and the stator and between the magnets and the stator. That is, the rotary frame 330 may be formed so as to surround the top surfaces, the bottom surfaces, and the outer circumferential surfaces of the rotor cores and the magnets. In the case in which the rotor is an inner rotor, the rotary frame 330 surrounds the rotor cores and the magnets excluding the outer circumferential surfaces of the rotor cores and the magnets, which define gaps between the rotor cores and the stator and between the magnets and the stator.

The top surface of the rotary frame 330 corresponds to the top surfaces of the rotor cores and the magnets. The bottom surface of the rotary frame 330 corresponds to the bottom surfaces of the rotor cores and the magnets. The radial outer side surface of the rotary frame 330 corresponds to the radial outer side surfaces of the rotor cores and the magnets. Since the top surface, the bottom surface, and the side surface of the rotary frame 330 are formed so as to cover the rotor cores and the magnets, the top surface, the bottom surface, and the side surface of the rotary frame 330 may be an upper cover 331, a lower cover 332, and a side cover 333 of the rotary frame 330. The side cover 333 may extend from the lower cover 332 to the upper cover 331.

The cover holes 332a are formed in the lower cover 331. Portions of the rotor cores 500 are exposed outward through the cover holes 332a. The cover holes 332a are formed by the fixing pins 660, which support the rotor cores 550 in the mold. In addition, edge holes 333a are formed in the lower cover 332 and the side cover 333. Portions of the bottom surfaces and the side surfaces of the magnets 400 are exposed outward through the edge holes 333a. The edge holes 333a are formed by the support seats 620, which support the magnets 400 in the mold. Consequently, the upper cover 331, the lower cover 332, and the side cover 333 of the rotary frame 330 surround the magnets 400 and the rotor cores 500, excluding the cover holes 332a and the edge holes 333a. As a result, the magnets 400 and the rotor cores 500 may be securely supported by the rotary frame 330.

Meanwhile, at least one of each magnet 400 and each rotor core 500 may have a fan shape due to the difference between the inner diameter and the outer diameter of each magnet 400 and each rotor core 500. For example, each magnet 400 may be rectangular, and each rotor core 500 may be fan-shaped. That is, the circumferential width of each rotor core 500 outward in the radial direction is larger than the circumferential width of each rotor core 500 inward in the radial direction.

The magnets 400 and the rotor cores 500 may be disposed so as to be in tight contact with each other in the circumferential direction due to the shape of the magnets 400 and the rotor cores 500. The movement of the magnets 400 and the rotor cores 500 inward in the radial direction in the state in which the magnets 400 and the rotor cores 500 are in tight contact with each other is limited because of the shape characteristics of the magnets 400 and the rotor cores 500. In this state, the radial outsides of the magnets 400 and the rotor cores 500 are covered by the side cover 333. Consequently, the movement of the magnets 400 and the rotor cores 500 outward and inward in the radial direction is limited.

In addition, the top surfaces and the bottom surfaces of the magnets 400 and the rotor cores 500 are covered by the lower cover 332 and the upper cover 331. Consequently, the movement of the magnets 400 and the rotor cores 500 upward and downward in the axial direction is limited.

As a result, the magnets 400 and the rotor cores 500 may be stably fixed to the rotary base 330.

As previously described, the fixing holes 536 may be formed in the rotor cores 500. The molding material may be injected into the fixing holes 536. The lower part of each fixing hole 536 is closed by a corresponding one of the fixing pins 660, but the upper part of each fixing hole 536 is open. Consequently, the molding material may be injected into the upper parts of the fixing holes 536. As a result, the molding material forms insertion parts 331a. The insertion parts 331a protrude from the lower cover 332 or the upper cover 331 toward the fixing holes 536. For example, in the case in which the insertion parts 331a are formed through the upper cover 331, the cover holes 332a are formed in the lower cover 332, rather than in the upper cover 331. The reason for this is that the insertion parts are formed from the upper cover 331 into the fixing holes 536 to close the fixing holes 536. For the lower cover 331, on the other hand, the insertion parts are not formed in the fixing holes 536 due to the fixing pins 660.

The insertion parts 331a are integrally formed with the lower cover 332 or the upper cover 331. As a result, the rotor cores 500 may be securely fixed to the rotor frame 300. In particular, the radial movement and the circumferential movement of the rotor cores 500 may be limited by the insertion parts 331a.

Meanwhile, the molding material is injected into the apertures formed in the rotor cores 500. The molding material connects the upper cover 331 and the lower cover 332 to form support posts 350, 351, and 352. Consequently, the rotor cores 500 may be securely fixed to the rotor frame 300 by the support posts.

In particular, the circumferential movement and the radial movement of the rotor cores 500 may be limited by the support posts.

FIGS. 5 and 6 show an example in which the mold is provided with fixing pins 660, and the fixing pins 660 are separated from the rotor frames 300. In this case, the fixing pins 660 may be repeatedly used. For this reason, each of the fixing pins 660 may be made of a metal material. Traces of the fixing pins 660 may be formed in the rotor frame 300, and may thus serve as the cover holes 332a. Of course, traces of the fixing pins 660 due to the height thereof (the insertion length of the fixing pins 660 into the fixing holes 536) may be formed as the insertion length of the insertion parts 331a.

Each of the fixing pins may be made of a plastic material, like the rotor frame 300. That is, the fixing pins may perform a function of fixing the rotor cores 500 in the mold and may constitute a portion of the rotor frame 300 after injection molding.

In this case, therefore, the cover holes 332a are not formed, and the fixing pins 660 substitute for the cover holes 331a. That is, the fixing pins 660 are integrally formed with the rotor frame 300 in the state in which the fixing pins 660 are disposed in the rotor cores 500. In other words, the fixing pins 660 may be integrally coupled to the rotor frame 300 during injection molding of the rotor frame 300.

According to this embodiment, it is easy to manufacture the mold. The reason for this is that it is not easy to integrally form a plurality of fixing pins with the mold. In the case in which the fixing pins, which are repeatedly used, are formed separately from the mold, much effort is required for coupling and separation between the fixing pins and the mold and separation between the fixing pins and the rotor frame.

In the case in which the fixing pins 660 constitute a portion of the rotor frame 300, however, each of the fixing pins 660 may be made of a plastic material, whereby the manufacturing process is simplified.

According to this embodiment, therefore, the insertion part 331a extending from the upper part of the fixing hole 536 and the fixing pin 660 extending from the lower part of the fixing hole 536 may be simultaneously provided in the fixing hole 536 of each rotor core 500 in the completed rotor frame 300. Of course, in the case in which the upper mold and the lower mold are reversed, for example, in the case in which injection molding is performed in the state in which the rotor frame 300 is as shown in FIG. 2, the fixing pin 660 may extend from the upper part of the fixing hole 536, and the insertion part 331a may extend from the lower part of the fixing hole 536.

In the case in which a sufficient amount of molding material is introduced into the fixing hole 536, the insertion part 331a contacts the fixing pin 660. Consequently, the insertion part 331a and the fixing pin 660 may be coupled to each other, whereby the rotor cores 500 may be more securely coupled to the rotor frame 300. In this case, the support posts for interconnecting the lower cover 332 and the upper cover 331 may be further formed.

Meanwhile, in the case in which the fixing pins 660 are integrally formed with the rotor frame 300, the fixing pins 660 protrude from the upper cover 331 or the lower cover 332 of the rotor frame 300. The reason for this is that a portion of each of the fixing pins 660 is inserted into a corresponding one of the fixing pin holes 610 of the mold, and the fixing pins 660 protrude by the insertion length after injection molding.

Figure 2:
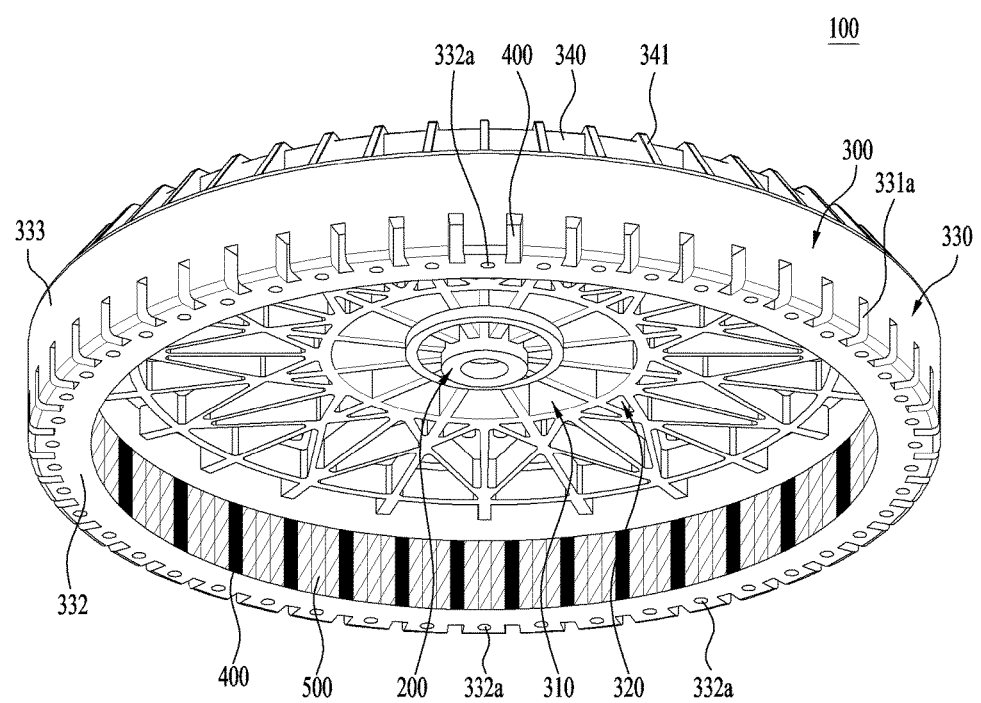
FIG. 2 is a view showing the rotor of FIG. 1 when viewed from below.

As shown in FIG. 2, the lower cover 332 of the rotary base 330 defines the lowermost surface of the rotor frame 300. In the case in which the fixing pins 660 are provided at the lower cover 332, therefore, the height of the rotor frame 300 may be increased. On the other hand, the upper cover 331 does not define the uppermost surface of the rotor frame 300.

In the case in which the fixing pins 660 are provided at the upper cover 331, therefore, the height of the rotor frame 300 is not changed.

In the case in which the fixing pins 660 are integrally provided at the rotor frame 300, therefore, the fixing pins 660 may be provided at the upper cover 331 of the rotor frame 300, rather than at the lower cover 332 thereof.

Meanwhile, in the above embodiment, the rotor cores 500 and the magnets 400 are supported in the lower part of the mold by the fixing pins 660. In this case, however, the rotor cores 500 and the magnets 400 may not be vertically disposed but may be inclined. That is, the rotor cores 500 and the magnets 400 may be fixed in the rotor frame 300 in the state of being inclined.

In order to solve this problem, the fixing pins 660 may be provided at the upper parts as well as the lower parts of the rotor cores 500. That is, the rotor cores 500 may be supported in the mold on the upper and lower sides of the rotor cores 500. For example, the fixing pins may be formed at the upper mold.

In the above embodiment, the lower fixing pins 660 are inserted into the fixing holes 536 of the rotor cores 500 when the lower parts of the rotor cores 500 are supported. However, the upper fixing pins may support the rotor cores 500 at different positions than the fixing holes 536.

For example, the upper fixing pins may be provided so as to simultaneously push the top surfaces of the rotor cores 500 and the magnets 400. That is, one upper fixing pin may push one rotor core 500 and one magnet 400 adjacent thereto.

In this case, one rotor core 500 and one magnet 400 may be fixed in the mold by the lower fixing pin, the upper fixing pin, and the support seat. Consequently, the magnets and the rotor cores may be manufactured such that the magnets and the rotor cores are vertically fixed.

After injection molding, the upper fixing pins are separated from the rotor frame to form the cover holes 331b, through which portions of the upper surfaces of the rotor cores 500 and the magnets 400 may be exposed outward.

That is, since the cover holes 332a formed by the lower fixing pins 660 correspond to the fixing holes 536 of the rotor cores 500, the portions of the bottom surfaces of the rotor cores 500 and the fixing holes 536 are exposed through the cover holes 332a. Since the cover holes 331b formed by the upper fixing pins do not correspond to the fixing holes 536, however, the fixing holes 536 are not exposed through the cover holes 331b. Of course, the top surfaces of the rotor cores and/or the top surfaces of the magnets may be exposed outward through the cover holes 331b.

Figure 7:
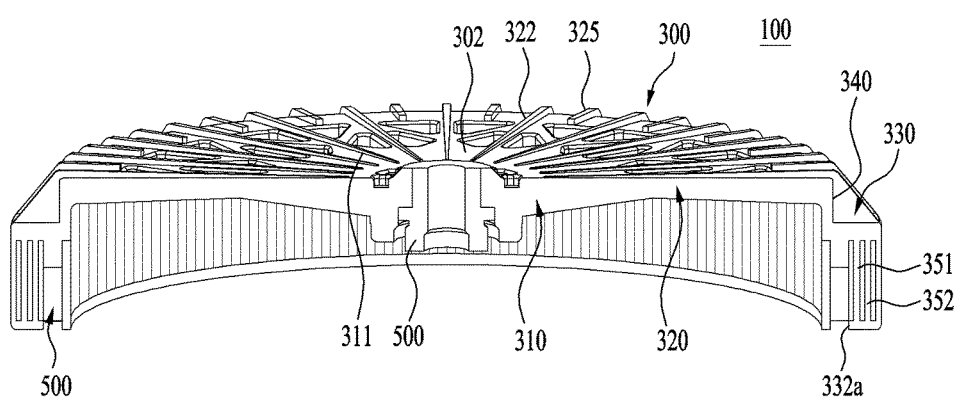
FIG. 7 is a sectional view showing the rotor of FIG. 1.
Figure 8:
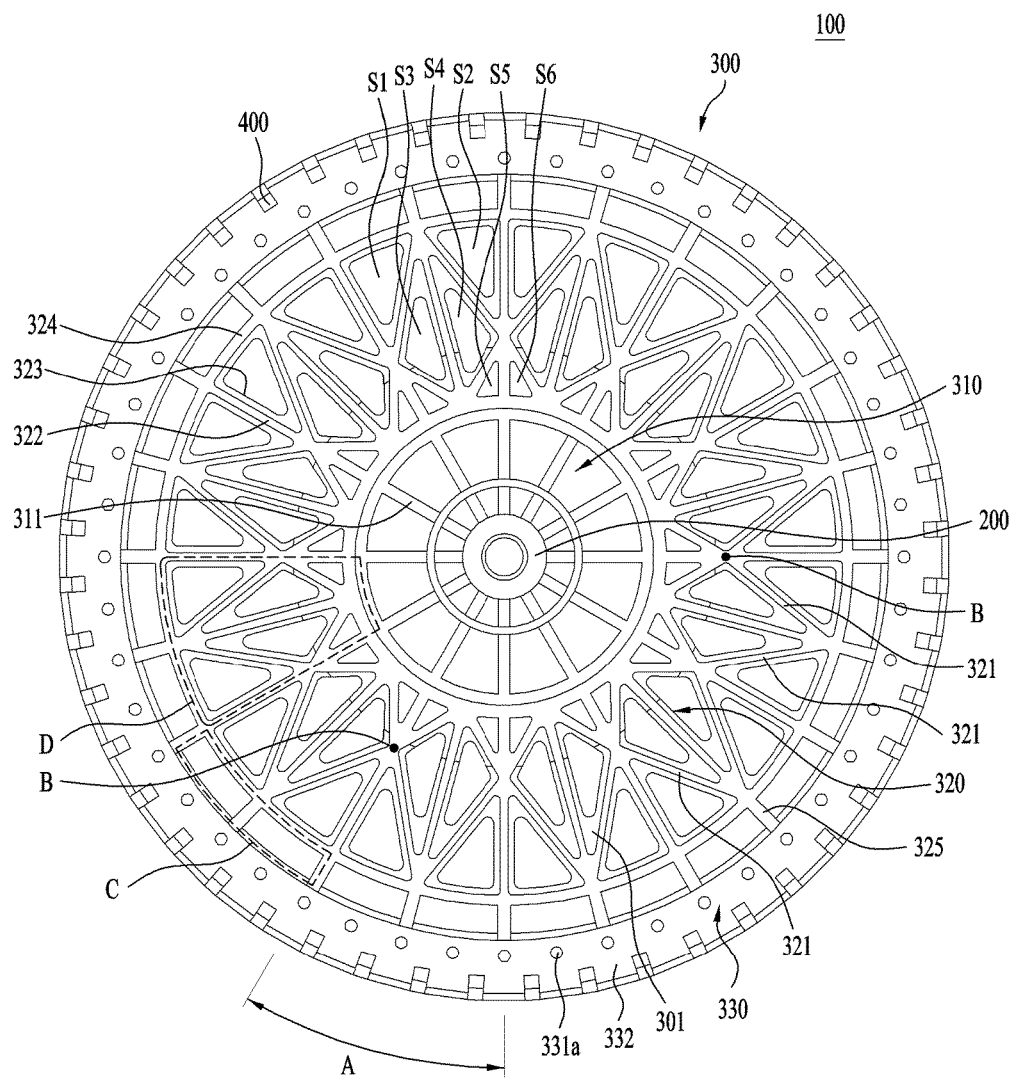
FIG. 8 is a view showing the rotor of FIG. 1 in the state of being overturned.
Figure 9:
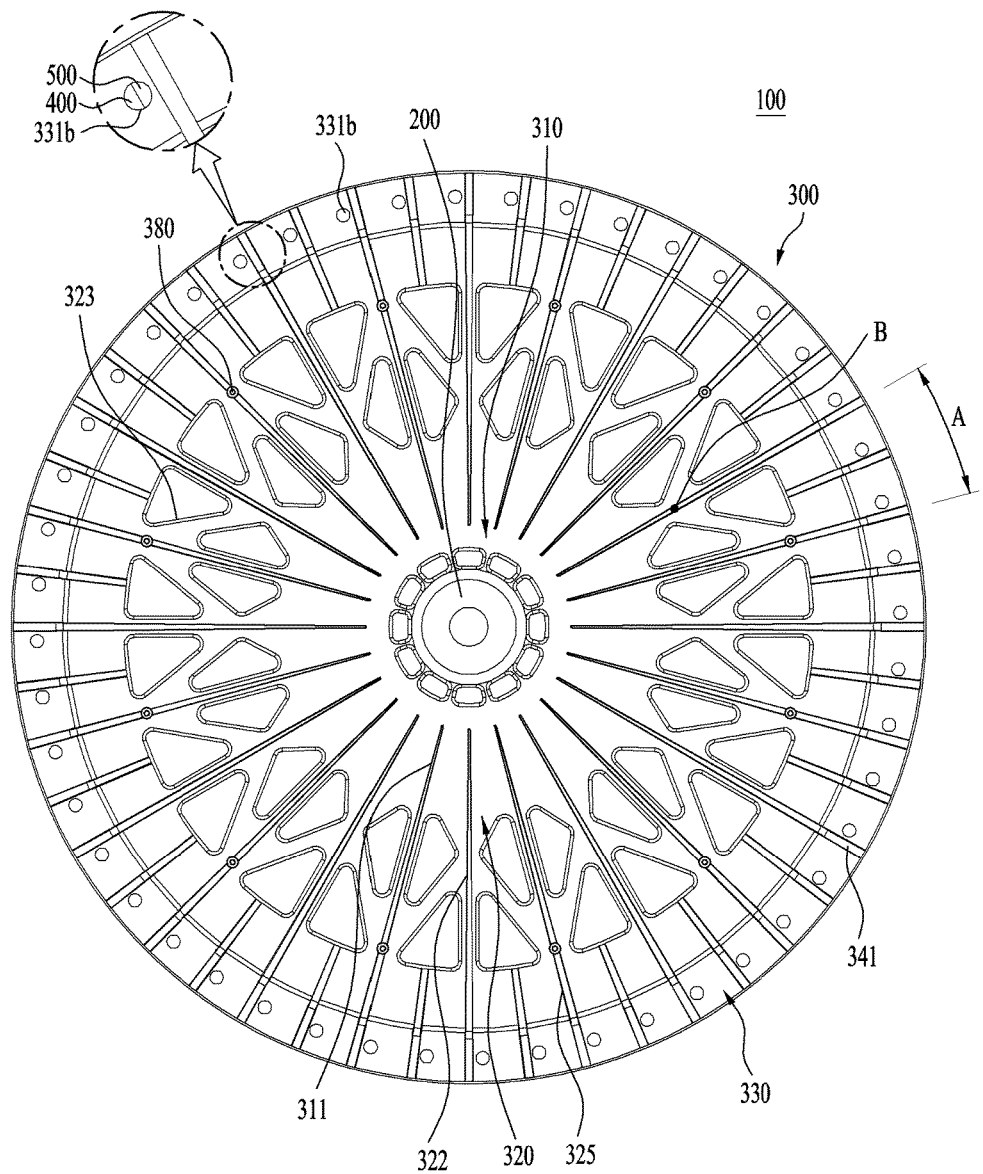
FIG. 9 is a view showing the rotor of FIG. 1 when viewed from above.

Hereinafter, the structure of the rotor frame 300 according to the embodiment of the present invention will be described with reference to FIGS. 7 and 8.

Force is applied to the rotor frame in different directions depending on the positional relationship between the coupler 200, located at the central part of the rotor frame 300, and the rotor cores 500 and the magnets 400, located at the outside of the rotor frame 300 in the radial direction.

Force may be applied to the rotor frame 300 in the axial direction (the z-axis direction), the radial direction (the y-axis direction), and the circumferential direction (the x-axis direction, i.e. the torque direction). Consequently, the rotor frame 300 may be formed so as to withstand force applied thereto in various directions. The force applied to the rotor frame 300 in various directions may be generated by torque, axial load, and vibration.

The rotation of the rotary base 330 is transmitted to the coupler base 310. At this time, the extension base 320, which is located between the rotary base 330 and the coupler base 310, may have low resistance to twisting. For this reason, the extension base 320 may be formed so as to have high resistance to twisting.

In addition, the height of the rotary base 330 is different from the height of the coupler base 310. This means that a force acting to pull the coupler base 310 inward or outward in the radial direction may be generated. For this reason, the extension base 320 may be formed so as to sufficiently withstand force generated from the rotary base 330 in the radial direction.

That is, the extension base 320 may be formed so as to sufficiently withstand bending moment as well as twisting.

Of course, the thickness of the rotary base 330 may be increased in order to increase rigidity of the extension base 320. In this case, however, manufacturing costs are increased. In addition, the weight of the rotor is increased, whereby the efficiency of the rotor may be reduced. Consequently, the shape and structure of the extension base 320 are critical in order to reduce material costs and to improve the efficiency of the rotor.

The rotor frame 300 may include a plurality of unit zones A arranged in the circumferential direction. The unit zones A may have the same shape and size. That is, the unit zones A may be repeatedly arranged in the circumferential direction to constitute a single rotor frame 300. FIG. 8 shows an example of a rotor frame 300 including twelve unit zones A.

In this embodiment, crossing ribs 321 are formed at the extension base 320 such that the extension base 320 has the optimal structure. That is, the strength of the extension base 320 may be increased by the crossing ribs 321.

The extension base 320 may include a plurality of zones D arranged in the circumferential direction. The zones D of the extension base 320 may be called sub-zones. The sub-zones D, which have the same shape and size, may be arranged in the circumferential direction to constitute a single extension base 320. One sub-zone means a zone constituting a portion of the extension base 320 in one unit zone A. That is, one unit zone A includes one sub-zone D of the extension base 320.

The crossing ribs 321 may be formed so as to cross obliquely in each sub-zone D. That is, one crossing rib 321 may extend obliquely and another crossing rib 321 may extend obliquely such that the crossing ribs 321 cross each other. Consequently, a zone between the radius defined by the radial inner tips of the crossing ribs and the radius defined by the radial outer tips of the crossing ribs may be a sub-zone D. Of course, the sub-zone D may be a crossing zone, since the sub-zone D is a zone defined by the crossing ribs.

The crossing zone D may withstand force generated between the coupler base 310 and the rotary base 330 in various directions by virtue of the crossing ribs 321.

The crossing ribs 321 cross to form a crossing point B. The crossing point B may be adjacent to the radial inner tips of the crossing ribs 321. That is, the crossing point B may be located inward in the radial direction from the center radius of the crossing point B. The reason for this is that if the crossing point B is close to the rotary base 330, the strength of the extension base 320 inward in the radial direction from the crossing point B may be reduced. In other words, the crossing point B may be further spaced apart from the rotary base 330 in consideration of the fact that moment is proportional to moment distance.

Meanwhile, the extension base 320 may be provided with a plurality of radial ribs 322 extending in the radial direction and arranged in the circumferential direction at uniform intervals. Each radial rib 322 may extend in the radial direction across a corresponding crossing point B. Each crossing point B may be formed between radial ribs 322 formed at the circumferentially opposed sides thereof. Consequently, one sub-zone or crossing zone D may include three radial ribs 322.

The radial ribs 322 are connected to the circumferential opposite tips of the crossing ribs 321. That is, the radial ribs 322 are circumferential bases for supporting the crossing ribs 321 in the circumferential direction. Consequently, the radial ribs 322 further prevent the generation of twisting in the sub-zones D.

A vertical through part 323 may be formed between one radial rib 322 and an adjacent radial rib 322. The through part 323 is a passage through which air flows. That is, the through part 323 may be an air through part.

The material costs of the rotor frame may be reduced by the provision of the through parts 323. That is, portions of the extension base 320 having no relation to the rigidity of the extension base 320 may be removed to thus reduce the material costs of the rotor frame. In addition, the through parts 323 dissipate heat generated from the stator.

Six sections S1 to S6 may be formed about the crossing point B by the three adjacent radial ribs 322 and the crossing ribs 321. That is, one sub-zone D may be partitioned into six sections S1 to S6 about the crossing point B.

The through parts 323 may be formed in all of the six sections. As previously described, however, the crossing point B may be biased inward in the radial direction from the radial center of the sub-zone D. Consequently, the areas of the two sections S5 and S6 located inside the crossing point B in the radial direction are much smaller than the areas of the other sections. Since the two sections S5 and S6 are biased inward in the radial direction, the sections S5 and S6 may be located further inward in the radial direction than the coils of the stator.

Consequently, the through parts 323 may not be formed in the sections S5 and S6 due to the relatively small areas of the sections S5 and S6 and the bias of the sections S5 and S6 inward in the radial direction.

Meanwhile, the sub-zones D may perform a function of dissipating heat from the stator through the through parts 323. For this reason, the sub-zones D may be heat dissipation zones.

The extension base 320 may include non-crossing zones C located outside the sub-zones D in the radial direction. The non-crossing zones C may connect the extension base 320 to the rotary base 330. In addition, the height of the non-crossing zones C may be different from the height of the rotary base 330 in the vicinity of the rotary base 330. Consequently, the non-crossing zones C may be formed so as to have high resistance to bending moment, rather than twisting.

As a result, the crossing ribs 321 may not extend to the non-crossing zones C. In addition, the through parts 323 may not be formed in the non-crossing zones C, or the size of the through parts 323 formed in the non-crossing zones C may be relatively small. The reason for this is that it is not necessary for the non-crossing zones C, which correspond to the tips of teeth of the stator, to have a heat dissipation function and that the non-crossing zones C may have low resistance to bending moment due to the through parts 323.

Since the non-crossing zones C have high resistance to bending moment, the non-crossing zones C may be reinforcement zones.

The crossing zones (heat dissipation zones) D and the non-crossing zones (reinforcement zones) C may be partitioned by circumferential ribs 324 formed in the circumferential direction.

The circumferential ribs 324 are connected to the radial tips of the crossing ribs 321. That is, the circumferential ribs 324 may be radial bases for supporting the crossing ribs 321 in the radial direction. Consequently, the circumferential ribs 324 further prevent the occurrence of twisting in the subzones D.

Meanwhile, the non-crossing zones C may be provided with radial ribs 325. The radial ribs 325 may be connected to the radial ribs 322. That is, the radial ribs 322 may extend to the non-crossing zones C in order to form the radial ribs 325. One non-crossing zone C may be provided with three radial ribs 325.

The coupler base 310 is also provided with radial ribs 311. The radial ribs 311 further extend in the radial direction so as to be connected to the radial ribs 322.

Consequently, the rotor frame 300 may be provided with radial ribs 311, 322, and 325, which continuously extend from the coupler base 310 to the radial tip of the extension base. The radial ribs 311, 322, and 325 may extend to the rotary base 330. That is, the connections of the rotary base 330 and the extension base 320 via the radial ribs may also be reinforced by the radial ribs.

The radial ribs 311, 322, and 325 are passages through which the molding material is uniformly injected into the rotor frame 300. That is, the ribs are formed so as to correspond to passages through which the molding material is injected into the mold.

Meanwhile, specific radial ribs may be formed so as to cross the circumferential centers of the rotor cores 500. That is, the specific radial ribs may further extend from the circumferential centers of the rotor cores 500 in the radial direction in order to form passages sufficient for injection of the molding material into the fixing holes 536 for supporting the rotor cores 500. Specifically, the radial ribs crossing the crossing point B may extend further in the radial direction than the centers of the rotor cores 500.

The rotor frame 300, particularly the coupler base 310 and the extension base 320, includes a reference bottom surface 301 and a reference top surface 302, which define the external shape of the rotor frame 300. That is, the thickness between the reference bottom surface 301 and the reference top surface 302 may be the basic thickness of the coupler base 310 and the extension base 320.

The above ribs may protrude from the reference bottom surface 301 and/or the reference top surface 302.

The radial ribs 311, 322, and 325 may protrude downward from the reference bottom surface 301. Circumferential ribs or support ribs 312 for partitioning the coupler base 310 and the extension base 320 in the radial direction and the circumferential ribs 324 of the extension base 320 may protrude downward from the reference bottom surface 301.

In addition, the radial ribs 311, 322, and 325 may protrude upward from the reference top surface 302. Consequently, the vertical width of the radial ribs may be further increased. As a result, the strength of the radial ribs may be further increased. In addition, the ribs perform a blade function of generating air flow, whereby the dissipation of heat through the through part 323 may be more effectively performed.

Meanwhile, the extension base 320 is connected to the rotary base 330 via a step part 340. The step part 340 is provided with radial ribs 341. As a result, the strength of the step part 340 may be increased.

The radial ribs 341 of the step part 340 may be formed as the result of further extension of the radial ribs 325 in the radial direction. The radial ribs 341 extend through the circumferential centers of the rotor cores 500. Consequently, a sufficient amount of molding material may be injected into the fixing holes 536 through the radial ribs 341.

During injection molding of the rotor frame 300, a mold injection port 350 (앞선 설명에서 350 '은 공극 입니다) may be located in the extension base 320. In particular, the mold injection port 350 may be provided further outward in the radial direction than the crossing points B. One mold injection port 350 may be formed in each unit zone A. As a result, the molding material may be uniformly injected into the rotor frame.

In particular, the mold injection ports 350 may be formed in the radial ribs 322. The radial ribs are formed so as to be adjacent to the radial ribs forming the crossing points. The molding material injection area around the radial ribs 322 forming the crossing points is relatively small due to the through parts 323. However, the molding material injection area around the radial ribs 322 adjacent to the radial ribs 322 forming the crossing points is relatively large. Consequently, the molding material may be easily distributed.

Meanwhile, the upper fixing pins, the lower fixing pins, and the support seats for supporting the rotor cores and the magnets in the mold may be equally applied to the rotor cores and the magnets shown in FIGS. 3 and 4.

As is apparent from the above description, the present invention has the effect of providing a rotor that can be easily manufactured and a motor including the same.

In addition, the present invention has the effect of providing a rotor that can be manufactured through a single injection molding process and a motor including the same.

In addition, the present invention has the effect of providing a rotor that is capable of minimizing the leakage of magnetic flux, thereby achieving high efficiency and high output and a motor including the same.

In addition, the present invention has the effect of providing a rotor that exhibits sufficient rigidity and strength while the weight of the rotor is reduced.

In addition, the present invention has the effect of providing a rotor that can be manufactured with reduced material costs and can be easily handled.

In addition, the present invention has the effect of providing a rotor having a cooling structure that is capable of limiting the increase in temperature of a stator or cooling the stator.

In addition, the present invention has the effect of providing a rotor configured such that rotor cores and magnets are coupled to a rotor frame at uniform intervals.

In addition, the present invention has the effect of providing a rotor configured such that rotor cores and magnets are securely coupled to a rotor frame.

In addition, the present invention has the effect of providing a rotor configured such that a plurality of magnets is disposed in a spoke arrangement so as to be magnetized inward and outward in the radial direction.

In addition, the present invention has the effect of providing a rotor configured such that magnets are entirely magnetized.

In addition, the present invention has the effect of providing a rotor configured such that fixing pins for fixing rotor cores in an injection mold are injection-molded so as to be integrally coupled to a rotor frame, whereby the rotor is manufactured through a simple manufacturing process.

Although the exemplary embodiments have been illustrated and described as above, of course, it will be apparent to those skilled in the art that the embodiments are provided to assist understanding of the present invention and the present invention is not limited to the above described particular embodiments, and various modifications and variations can be made in the present invention without departing from the spirit or scope of the present invention, and the modifications and variations should not be understood individually from the viewpoint or scope of the present invention.

What is claimed is:

1. A rotor comprising:
a plurality of rotor cores;
a plurality of magnets magnetized such that magnetic flux is formed in a circumferential direction, the magnets and the rotor cores being alternately arranged in the circumferential direction;
a coupler connected to a shaft; and
a rotor frame comprising a coupler base connected to the coupler, an extension base extending from the coupler base in a radial direction, and a rotary base extending from the extension base in an axial direction of the shaft for supporting the rotor cores and the magnets while surrounding the rotor cores and the magnets, wherein
the coupler base, the extension base, and the rotary base are integrally formed by injection molding, and the rotor frame is coupled to the coupler, the rotor cores, and the magnets, and wherein
the extension base is provided with a plurality of radial ribs extending in the radial direction and arranged in the circumferential direction at uniform intervals and crossing ribs that cross in the radial direction to form a crossing point,
wherein a specific one of the radial ribs extends through the crossing point in the radial direction, and
wherein the crossing ribs are provided between radial ribs formed at circumferentially opposed sides of the specific radial rib.

2. The rotor according to claim 1, wherein the extension base comprises a crossing zone formed between radial inner tips of the crossing ribs and radial outer tips of the crossing ribs.

3. The rotor according to claim 2, wherein the crossing point of the crossing ribs is adjacent to the radial inner tips of the crossing ribs.

4. The rotor according to claim 1, wherein a vertical through part is formed between each of the crossing ribs and a corresponding one of the radial ribs.

5. The rotor according to claim 4, wherein
six sections are formed about the crossing point by the three adjacent radial ribs and the crossing ribs, and
the through parts are formed in four of the sections, excluding two of the sections having a smallest area and located inward in the radial direction.

6. The rotor according to claim 1, wherein the extension base comprises a non-crossing zone located outside the crossing zone in the radial direction and connected to the rotary base.

7. The rotor according to claim 6, wherein the non-crossing zone is connected to the rotary base via a step part.

8. The rotor according to claim 6, wherein the crossing zone and the non-crossing zone are partitioned by circumferential ribs formed in the circumferential direction.

9. The rotor according to claim 8, wherein
the radial ribs are continuously connected from the coupler base to the rotary base.

10. The rotor according to claim 9, wherein the specific radial rib extends through a circumferential center of a specific one of the rotor cores, and an adjacent radial rib extends through the circumferential center of a rotor core that is two cores away from the specific rotor core in the circumferential direction.

11. The rotor according to claim 10, wherein the non-crossing zone is provided with a radial rib formed at a middle part between the two adjacent radial ribs so as to extend through a circumferential center of a corresponding one of the rotor cores.

12. The rotor according to claim 11, wherein
the rotor frame comprises a reference bottom surface and a reference top surface that define an external shape thereof, and
the radial ribs protrude downward from the reference bottom surface.

13. The rotor according to claim 12, wherein the radial ribs and the circumferential ribs protrude upward from the reference top surface.

14. The rotor according to claim 11, wherein the non-crossing zone is connected to the rotary base via a step part, and the radial ribs extend to a radial tip of the rotary base via the step part.

15. The rotor according to claim 8, wherein the coupler base and the extension base are partitioned by support ribs formed in the circumferential direction.

16. The rotor according to claim 13, wherein no vertical through parts are formed in the coupler base and the non-crossing zone.

17. A rotor comprising:
a plurality of rotor cores having a fixing hole;
a plurality of magnets magnetized such that magnetic flux is formed in a circumferential direction, the magnets and the rotor cores being alternately arranged in the circumferential direction;
a coupler connected to a shaft; and
a rotor frame comprising a coupler base connected to the coupler, an extension base extending from the coupler base in a radial direction, and a rotary base extending from the extension base in an axial direction of the shaft for supporting the rotor cores and the magnets while surrounding the rotor cores and the magnets, wherein
the coupler base, the extension base, and the rotary base are integrally formed by injection molding, and the rotor frame is coupled to the coupler, the rotor cores, and the magnets,
wherein the rotor frame is provided with a cover hole formed as a result of separation of a fixing pin from the fixing hole after the injection molding of the rotor frame,
wherein a portion of each of the rotor cores fixed in the rotor frame is exposed outward through the cover hole, and wherein
the rotary base is formed so as to surround top surfaces, bottom surfaces, and outer circumferential surfaces of the rotor cores and the magnets excluding inner circumferential surfaces of the rotor cores and the magnets that define gaps between the rotor cores and a stator and between the magnets and the stator, or
the rotary base is formed so as to surround the top surfaces, the bottom surfaces, and the inner circumferential surfaces of the rotor cores and the magnets excluding the outer circumferential surfaces of the rotor cores and the magnets that define gaps between the rotor cores and a stator and between the magnets and the stator.

* * * * *